United States Patent
Hayabe et al.

(10) Patent No.: US 11,958,950 B2
(45) Date of Patent: Apr. 16, 2024

(54) ION EXCHANGE MEMBRANE AND METHOD FOR PRODUCING DRY ION EXCHANGE MEMBRANE

(71) Applicant: AGC Inc., Tokyo (JP)

(72) Inventors: Shintaro Hayabe, Tokyo (JP); Osamu Homma, Tokyo (JP); Yasushi Yamaki, Tokyo (JP); Tatsuya Miyajima, Tokyo (JP); Takuo Nishio, Tokyo (JP)

(73) Assignee: AGC Inc., Tokyo (JP)

( * ) Notice: Subject to any disclaimer, the term of this patent is extended or adjusted under 35 U.S.C. 154(b) by 758 days.

(21) Appl. No.: 17/063,058

(22) Filed: Oct. 5, 2020

(65) Prior Publication Data

US 2021/0017347 A1 Jan. 21, 2021

Related U.S. Application Data

(63) Continuation of application No. PCT/JP2019/023744, filed on Jun. 14, 2019.

(30) Foreign Application Priority Data

Jun. 15, 2018 (JP) ................................. 2018-114511
Jan. 31, 2019 (JP) ................................. 2019-016153

(51) Int. Cl.
*C08J 5/22* (2006.01)
*H01M 8/1039* (2016.01)

(52) U.S. Cl.
CPC ......... *C08J 5/2225* (2013.01); *H01M 8/1039* (2013.01); *C08J 2327/12* (2013.01)

(58) Field of Classification Search
USPC .......................................................... 521/27
See application file for complete search history.

(56) References Cited

U.S. PATENT DOCUMENTS

2002/0064700 A1  5/2002  Higuchi et al.

FOREIGN PATENT DOCUMENTS

| JP | 58-119348 A | 7/1983 |
| JP | 4-221088 A | 8/1992 |
| JP | 2001-35510 A | 2/2001 |
| JP | 2005-60516 A | 3/2005 |
| JP | 2007-26727 A | 2/2007 |
| JP | 2007-26757 A | 2/2007 |
| JP | 2014-86205 A | 5/2014 |
| WO | WO 2005/058980 A1 | 6/2005 |

OTHER PUBLICATIONS

International Search Report dated Aug. 27, 2019 in PCT/JP2019/023744 filed Jun. 14, 2019, 2 pages.

*Primary Examiner* — Fred M Teskin
(74) *Attorney, Agent, or Firm* — Oblon, McClelland, Maier & Neustadt, L.L.P.

(57) ABSTRACT

An ion exchange membrane containing a fluorinated polymer, wherein in a case where by Raman spectroscopy, polarized light orthogonal to the thickness direction of the ion exchange membrane is irradiated to obtain a spectrum chart, whereby the ratio of the peak area a2 of Raman shift 680 to 760 $cm^{-1}$ to the peak area a1 of Raman shift 1,025 to 1,095 $cm^{-1}$ is taken as A1, and by Raman spectroscopy, to a cross section in the thickness direction of the ion exchange membrane, polarized light parallel with the thickness direction is irradiated to obtain a spectrum chart, whereby the ratio of the peak area b2 of Raman shift 920 to 1,025 $cm^{-1}$ to the peak area b1 of Raman shift 1,025 to 1,095 $cm^{-1}$ is taken as B1, B1/A1 is at least 1.05.

11 Claims, 2 Drawing Sheets

ION EXCHANGE MEMBRANE AND METHOD FOR PRODUCING DRY ION EXCHANGE MEMBRANE

TECHNICAL FIELD

The present invention relates to an ion exchange membrane and a method for producing a dry ion exchange membrane.

BACKGROUND ART

Ion exchange membranes are used in various batteries, electrolysis processes and ion separation processes.

Patent Document 1 discloses a method of drying a membrane containing a fluorinated polymer having an acid-type ion exchange group (—$SO_3H$ group) to obtain a dry ion exchange membrane containing a fluorinated polymer having an —$SO_3H$ group.

Further, Patent Document 2 discloses a method of sealing a membrane containing a fluorinated polymer having a metal salt type ion-exchange group (—$SO_3Na$ group) in a container together with water, followed by heating and drying to obtain an ion exchange membrane in a dry state containing a fluorinated polymer having an —$SO_3Na$ group. An ion exchange membrane that is distributed in the market in a dry state has advantages such as excellent transport efficiency and suppression of generation of mold or the like during storage, as compared with an ion exchange membrane that is distributed in a market in a wet state.

PRIOR ART DOCUMENTS

Patent Documents

Patent Document 1: JP-A-2005-060516
Patent Document 2: WO2005/058980

DISCLOSURE OF INVENTION

Technical Problem

Ion exchange membranes installed in tanks of various devices are used in a state of being immersed in an electrolytic solution such as saline solution, hydrochloric acid solution or water depending on the ion species to be ion-exchanged. When an ion exchange membrane in a dry state as described in Patent Document 1 or 2 is set in a tank and immersed in an electrolytic solution, the dimension in the in-plane direction increases due to e.g. swelling of the ion exchange membrane, whereby, in some cases, wrinkles may occur in the ion exchange membrane, or cracks may occur in the ion exchange membrane due to contact with a jig in the tank.

In view of the above situation, it is an object of the present invention to provide an ion exchange membrane which is excellent in dimensional stability in the in-plane direction of the ion exchange membrane when immersed in an electrolytic solution, and a method for producing a dry ion exchange membrane.

Solution to Problem

As a result of diligent studies on the above problem, the present inventors have found that in an ion exchange membrane containing a fluorinated polymer having a group represented by —$SO_3M$ and, in the main chain, a group represented by —$CF_2$—, if by Raman spectroscopy, the value calculated from the spectrum chart obtained by irradiating to the cross section in the thickness direction of the ion exchange membrane, polarized light orthogonal to the thickness direction, and the value calculated from the spectrum chart obtained by irradiating polarized light parallel to the thickness direction, satisfy a predetermined relationship, the dimensional stability in the in-plane direction of the ion exchange membrane, will be excellent when it is immersed in the electrolytic solution, and thus have arrived at the present invention.

Further, as a result of diligent studies on the above problems, the present inventors have found that at the time of drying a wet ion exchange membrane i.e. an ion exchange membrane containing a fluorinated polymer having a sulfonic acid type functional group swollen in a liquid medium, by conducting the drying under specific conditions, the dimensional stability in the in-plane direction of the ion-exchange membrane will be excellent when immersed in an electrolytic solution, and thus, have arrived at the present invention.

The present inventors have found that the above-mentioned object can be achieved by the following embodiments.

[1] An ion exchange membrane containing a fluorinated polymer having a group represented by —$SO_3M$ (M is a hydrogen atom, an alkali metal or a quaternary ammonium cation) and, in the main chain, a group represented by —$CF_2$—, wherein in a case where by Raman spectroscopy, to a cross section in the thickness direction of the ion exchange membrane, polarized light orthogonal to the thickness direction is irradiated to obtain a spectrum chart, whereby the ratio of the peak area a2 of Raman shift 680 to 760 $cm^{-1}$ to the peak area a1 of Raman shift 1,025 to 1,095 $cm^{-1}$ is taken as A1, and by Raman spectroscopy, to a cross section in the thickness direction of the ion exchange membrane, polarized light parallel to the thickness direction is irradiated to obtain a spectrum chart, whereby the ratio of the peak area b2 of Raman shift 680 to 760 $cm^{-1}$ to the peak area b1 of Raman shift 1,025 to 1,095 $cm^{-1}$ is taken as B1, the ratio of said B1 to said A1 is at least 1.05.

[2] The ion exchange membrane according to [1], wherein the fluorinated polymer further has an ether bond site in a side chain, and in a case where by Raman spectroscopy, to a cross section in the thickness direction of the ion exchange membrane, polarized light orthogonal to the thickness direction is irradiated to obtain a spectrum chart, whereby the ratio of the peak area a3 of Raman shift 920 to 1,025 $cm^{-1}$ to the peak area a1 of Raman shift 1,025 to 1,095 $cm^{-1}$ is taken as A2, and by Raman spectroscopy, to a cross section in the thickness direction of the ion exchange membrane, polarized light parallel to the thickness direction is irradiated to obtain a spectrum chart, whereby the ratio of the peak area b3 of Raman shift 920 to 1,025 $cm^{-1}$ to the peak area b1 of Raman shift 1,025 to 1,095 $cm^{-1}$ is taken as B2, the ratio of said B2 to said A2 is larger than 1.05.

[3] The ion exchange membrane according to [1], wherein the fluorinated polymer further has an ether bond site in a side chain, and in a case where by Raman spectroscopy, to a cross section in the thickness direction of the ion exchange membrane, polarized light orthogonal to the thickness direction is irradiated to obtain a spectrum chart, whereby the ratio of the height h2 of the highest peak within a range of Raman shift 920 to 1,025 cm$^{-1}$ to the height h1 of the highest peak within a range of Raman shift 1,025 to 1,095 cm$^{-1}$ is taken as H1, and by Raman spectroscopy, to a cross section in the thickness direction of the ion exchange membrane, polarized light parallel to the thickness direction is irradiated to obtain a spectrum chart, whereby the ratio of the height h4 of the highest peak within a range of Raman shift 920 to 1,025 cm$^{-1}$ to the height h3 of the highest peak within a range of Raman shift 1,025 to 1,095 cm$^{-1}$ is taken as H2, the ratio of said H2 to said H1 is at least 1.05.

[4] The ion exchange membrane according to any one of [1] to [3], wherein the fluorinated polymer has a unit represented by the formula (1):

  Formula (1)

in the formula (1), L is an n+1-valent perfluorohydrocarbon group which may contain an oxygen atom, M is a hydrogen atom, an alkali metal or a quaternary ammonium cation, and n is 1 or 2.

[5] The ion exchange membrane according to [4], wherein the ether bond site of the side chain is a site contained in a unit obtained by polymerizing at least one type of monomer selected from the group consisting of the following monomers (A) to (E):

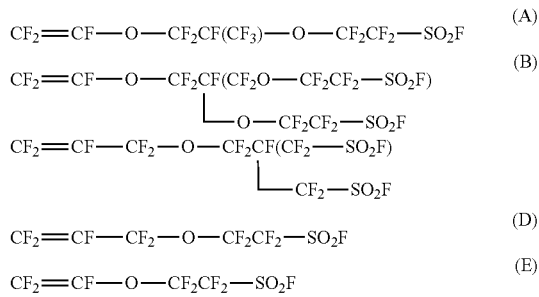

[6] The ion exchange membrane according to any one of [1] to [5], wherein the ion exchange capacity of the fluorinated polymer is larger than 0.90 meq/g dry resin.

[7] The ion exchange membrane according to any one of [1] to [6], wherein the ion exchange membrane contains a liquid medium, and the content of the liquid medium in the ion exchange membrane is at most 15 mass % to the total mass of the ion exchange membrane.

[8] The ion exchange membrane according to [7], wherein the liquid medium is at least one of water and a water-soluble organic solvent.

[9] A method for producing a dry ion exchange membrane, comprising drying a wet ion exchange membrane having an ion exchange membrane containing a fluorinated polymer having a sulfonic acid type functional group wet with a liquid medium, to remove the liquid medium to obtain a dry ion exchange membrane, characterized in that the dimensional change of the dry ion exchange membrane from the wet ion exchange membrane during drying is at least −5% in each of the MD direction and the TD direction.

[10] The method for producing a dry ion exchange membrane according to [9], wherein the content of the liquid medium in the dry ion exchange membrane is at most 15 mass % to the total mass of the dry ion exchange membrane.

[11] The method for producing a dry ion exchange membrane according to [9] or [10], wherein the drying temperature is at least the softening point of the fluorinated polymer.

[12] The method for producing a dry ion exchange membrane according to any one of [9] to [11], wherein the dimensional change of the dry ion exchange membrane from the wet ion exchange membrane during drying is at most 50% in each of the MD direction and the TD direction.

[13] The method for producing a dry ion exchange membrane according to any one of [9] to [12], wherein the content of the liquid medium in the wet ion exchange membrane is at least 20 mass % to the total mass of the wet ion exchange membrane.

[14] The method for producing a dry ion exchange membrane according to any one of [9] to [13], wherein the wet ion exchange membrane is obtained by contacting the ion exchange membrane containing the fluorinated polymer with the liquid medium at a temperature of at least 60° C.

[15] The method for producing a dry ion exchange membrane according to any one of [9] to [14], wherein a reinforcing material is contained inside or at the surface of the wet ion exchange membrane.

Advantageous Effects of Invention

According to the present invention, it is possible to provide an ion exchange membrane which is excellent in dimensional stability in the in-plane direction of the ion exchange membrane when immersed in an electrolytic solution, and a method for producing a dry ion exchange membrane.

DESCRIPTION OF EMBODIMENTS

Figure 1:
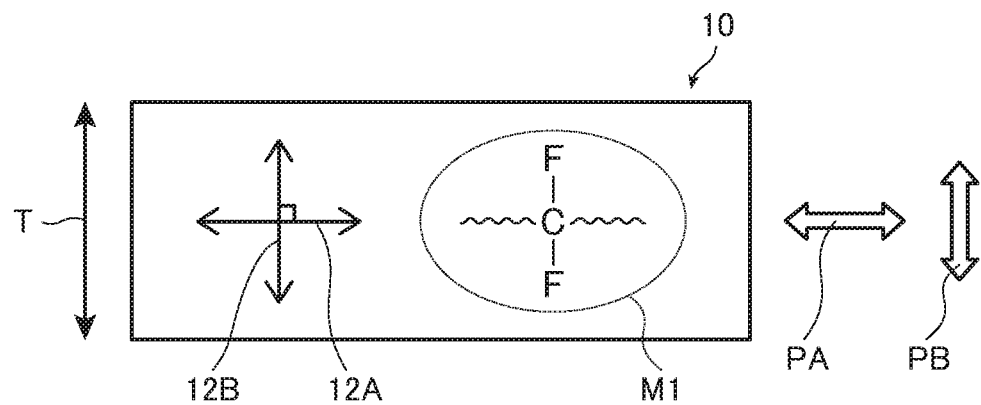
FIG. 1 is a diagram for illustrating the relationship between the irradiation direction of polarized light by Raman spectroscopy and the orientation direction of a fluorinated polymer.

The meanings of the following terms in the present specification are as follows.

A "sulfonic acid type functional group" means a sulfonic acid group ($-SO_3H$) or a sulfonate group ($-SO_3M^2$, where $M^2$ is an alkali metal or a quaternary ammonium cation).

A "precursor membrane" is a membrane containing a polymer having a group capable of being converted to a sulfonic acid type functional group.

A "group capable of being converted to a sulfonic acid type functional group" means a group capable of being converted to a sulfonic acid type functional group by a treatment such as a hydrolysis treatment or an acid type treatment.

A "unit" in a polymer means an atomic group derived from one molecule of a monomer, which is formed by polymerization of the monomer. The unit may be an atomic group directly formed by the polymerization reaction, or an atomic group in which a part of the atomic group is converted to another structure by treating the polymer obtained by the polymerization reaction.

A "reinforcing material" means a member to be used to improve the strength of an ion exchange membrane.

A "reinforcing cloth" means a cloth to be used as a member to be a base of a reinforcing material to improve the strength of an ion exchange membrane.

A "reinforcing yarn" is a yarn that constitutes a reinforcing cloth, and is a yarn that does not elute under the usage conditions of an ion exchange membrane.

The numerical range represented by "to" means a range including the numerical values described before and after "to" as the lower limit value and the upper limit value. When the units of the lower limit value and the upper limit value are the same, the unit of the lower limit value may be omitted for simplification.

The "MD direction" means the transport direction of a wet ion exchange membrane during the production of a dry ion exchange membrane, and means the longitudinal direction in a case where a dry ion exchange membrane is produced by using a long wet ion exchange membrane.

The "TD direction" means the direction intersecting the MD direction in the plane of the wet ion exchange membrane (the width direction of the wet ion exchange membrane).

[Method for Producing Dry Ion Exchange Membrane]

The method for producing a dry ion exchange membrane of the present invention (hereinafter referred to also as the present production method) is a method for obtaining a dry ion exchange membrane by drying a wet ion exchange membrane having an ion exchange membrane containing a fluorinated polymer having a sulfonic acid type functional group (hereinafter referred to also as a fluorinated polymer (S)) swollen with a liquid medium, and a method wherein the dimensional change of the dry ion exchange membrane from the wet ion exchange membrane during drying is made to be at least −5%, preferably at least −3%, in each of the MD direction and the TD direction, in other words, the shrinkage ratio is within 5%, preferably within 3%. To achieve this, the wet ion exchange membrane may be dried while being stretched so that the stretching ratio is 0% or more, preferably 5% or more.

When the dry ion-exchange membrane thus obtained is placed in a tank and immersed in an electrolytic solution while in use, it will be excellent in dimensional stability in the in-plane direction. In the present specification, "excellent in dimensional stability in the in-plane direction of the ion exchange membrane" means that when the dry ion exchange membrane is immersed in an electrolytic solution (specifically, saline solution, hydrochloric acid solution, water, etc.), the dimensional change in the in-plane direction of the ion exchange membrane is small.

Normally, when a wet ion exchange membrane is dried, the liquid medium is removed, whereby the ion exchange membrane shrinks. At that time, by suppressing shrinkage in the TD and MD directions and keeping the shrinkage ratio within a certain value or keeping the stretch ratio to be at least 0%, internal stress due to drying does not remain in the dry ion exchange membrane, and it is presumed that the dimensional stability in the in-plane direction will be excellent when the ion-exchange membrane is swollen as immersed in an electrolytic solution.

Further, the dry ion exchange membrane obtained by the present production method has such a nature that the dimension in the thickness direction of the ion exchange membrane becomes large when it is placed in a tank and immersed in an electrolytic solution at the time of use. It is presumed that the shrinkage in the thickness direction becomes larger due to the suppression of shrinkage in the TD and MD directions, and the expansion in the thickness direction becomes larger when the ion exchange membrane is swollen by being immersed in the electrolytic solution.

The dry ion-exchange membrane obtained by the present production method also has such an effect that since the dimension in the thickness direction becomes large when placed in a tank and immersed in an electrolytic solution, the adhesion with packing becomes good and sealing performance will be excellent.

In the dry ion exchange membrane obtained by the production method of the present invention, the content of the liquid medium is preferably at most 15 mass %, more preferably at most 12 mass %, particularly preferably at most 10 mass %, to the total mass of the dry ion exchange membrane. The lower limit may be 1 mass %.

On the other hand, drying of the wet ion exchange membrane is preferably carried out until the content of the liquid medium in the obtained dry ion exchange membrane becomes at most 10 mass %, more preferably carried out until the content becomes at most 7 mass %, particularly preferably carried out until the content becomes at most 5 mass %. The lower limit may be 1 mass %.

Even if the ion exchange membrane is sufficiently dried in the production process, if the dry ion exchange membrane is left to stand, it is likely to absorb moisture, whereby the content of the liquid medium in the ion exchange membrane tends to increase. The thickness of the dry ion exchange membrane obtained by the production method of the present invention is, from the viewpoint of maintaining a constant strength, preferably at least 20 µm, particularly preferably at least 40 µm, and, from the viewpoint of improving current efficiency and voltage efficiency, preferably at most 300 µm, particularly preferably at most 200 µm.

Hereinafter, each material to be used in the present production method will be described, and then the production method will be described in detail.

<Wet Ion Exchange Membrane>

The wet ion exchange membrane to be used in the present production method is an ion exchange membrane wet with a liquid medium. The fluorinated polymer (S) contained in the wet ion exchange membrane contains a liquid medium and is in a swollen state.

The content of the liquid medium in the wet ion exchange membrane is preferably at least 20 mass %, more preferably at least 30 mass %, further preferably at least 40 mass %, to the total mass of the wet ion exchange membrane, since the dimensional stability in the in-plane direction of the ion exchange membrane will be more excellent. From the viewpoint of excellent drying efficiency, the content of the liquid medium is preferably at most 150 mass %, more preferably at most 140 mass %, further preferably at most 130 mass %.

The thickness of the wet ion-exchange membrane is, from the viewpoint of maintaining a constant strength, preferably at least 30 µm, more preferably at least 40 µm, and, from the viewpoint of improving current efficiency and voltage efficiency, preferably at most 500 µm, more preferably at most 300 µm, further preferably at most 180 µm.

(Liquid Medium)

The liquid medium may be any medium so long as it can swell the fluorinated polymer (S), and an organic solvent and water may be mentioned. The liquid medium may be either an organic solvent or water, or a mixture of both. As the organic solvent, one type may be used alone, or two or more types may be used in combination.

As the organic solvent capable of swelling the fluorinated polymer (S), a water-soluble organic solvent may be mentioned. In the present specification, the water-soluble organic solvent is an organic solvent which is easily dissolved in water, and specifically, an organic solvent of which the solubility in 1,000 ml of water (20° C.) is preferably at least 0.1 g, particularly at least 0.5 g, is more preferred. The water-soluble organic solvent preferably contains at least one member selected from the group consisting of aprotic organic solvents, alcohols and amino alcohols, and more preferably contains an aprotic organic solvent.

As the water-soluble organic solvent, one type may be used alone, or two or more types may be used in combination.

Specific examples of the aprotic organic solvent include dimethylsulfoxide, N,N-dimethylformamide, N,N-dimethylacetamide, N-methyl-2-pyrrolidone and N-ethyl-2-pyrrolidone, and dimethylsulfoxide is preferred.

Specific examples of alcohols include methanol, ethanol, isopropanol, butanol, methoxyethoxyethanol, butoxyethanol, butylcarbitol, hexyloxyethanol, octanol, 1-methoxy-2-propanol and ethylene glycol.

Specific examples of amino alcohols include ethanolamine, N-methylethanolamine, N-ethylethanolamine, 1-amino-2-propanol, 1-amino-3-propanol, 2-aminoethoxyethanol, 2-aminothioethoxyethanol and 2-amino-2-methyl-1-propanol.

(Fluorinated Polymer (S))

The ion-exchange capacity of the fluorinated polymer (S) is, from the viewpoint of excellent voltage efficiency, preferably at least 0.90 meq/g dry resin (referred to also as meq/g), more preferably at least 1.00 meq/g, further preferably larger than 1.05 meq/g, particularly preferably at least 1.10 meq/g.

Further, from the viewpoint of the balance between current efficiency and voltage efficiency, the ion exchange capacity of the fluorinated polymer (S) is preferably at most 2.05 meq/g, more preferably at most 1.50 meq/g, particularly preferably at most 1.25 meq/g.

The fluorinated polymer (S) to be used in the wet ion exchange membrane may be one type, or two or more types may be used as laminated or mixed.

Further, the wet ion exchange membrane may contain a polymer other than the fluorinated polymer (S), but it is preferably substantially composed of the fluorinated polymer (S). Substantially composed of the fluorinated polymer (S) means that the content of the fluorinated polymer (S) is at least 90 mass % to the total mass of the polymers in the wet ion exchange membrane. The upper limit of the content of the fluorinated polymer (S) may be 100 mass % to the total mass of the polymers in the wet ion exchange membrane.

A case where the wet ion exchange membrane contains a polymer other than the fluorinated polymer (S) may, for example, be a case where the wet ion exchange membrane contains a fluorinated polymer having a carboxylic acid type functional group (hereinafter referred to also as fluorinated polymer (C)). An embodiment thereof is an ion exchange membrane in which the fluorinated polymer (S) and the fluorinated polymer (C) are laminated in layers. Here, the carboxylic acid type functional group means a carboxy group or a carboxylate group.

The sulfonic acid type functional group contained in the fluorinated polymer (S) is, from the viewpoint that the obtainable dry ion exchange membrane will be excellent in handling efficiency, preferably a sulfonate group ($-SO_3M^2$), more preferably a sodium sulfonate group. Here, the definition of $M^2$ is as described above. In addition, a sulfonic acid group is also preferred, because it is highly versatile for various uses.

The fluorinated polymer (S) preferably has a group represented by $-CF_2-$ in the main chain, and more specifically, it preferably contains a unit based on a fluorinated olefin as well as a unit having a sulfonic acid type functional group and unit having a fluorine atom.

The fluorinated olefin may, for example, be a $C_2$ or $C_3$ fluoroolefin having one or more fluorine atoms in the molecule. Specific examples thereof include tetrafluoroethylene (hereinafter referred to also as "TFE"), chlorotrifluoroethylene, vinylidene fluoride, vinyl fluoride and hexafluoropropylene. Among them, TFE is preferred because it is excellent in production cost, reactivity with other monomers, and properties of the resulting fluorinated polymer (S). As the fluorinated olefin, one type may be used alone, or two or more types may be used in combination.

As the unit having a sulfonic acid type functional group and a fluorine atom, a unit represented by the formula (1) is preferred.

$-[CF_2-CF(-L-(SO_3M)_n)]-$      Formula (1):

Here, L is an n+1-valent perfluorohydrocarbon group which may contain an oxygen atom. The oxygen atom may be located at the terminal of the perfluorohydrocarbon group or between carbon atoms.

The number of carbon atoms in the (n+1)-valent perfluorohydrocarbon group is preferably at least 1, more preferably at least 2, and preferably at most 20, more preferably at most 10.

As L, an n+1-valent perfluoroaliphatic hydrocarbon group which may contain an oxygen atom is preferred, and a divalent perfluoroalkylene group which may contain an oxygen atom in the mode of n=1, or a trivalent perfluoroaliphatic hydrocarbon group which may have an oxygen atom in the mode of n=2, is more preferred. The divalent perfluoroalkylene group may be linear or branched.

M is a hydrogen atom, an alkali metal or a quaternary ammonium cation. n is 1 or 2.

As the unit represented by the formula (1), a unit represented by the formula (1-1), a unit represented by the formula (1-2), a unit represented by the formula (1-3) or a unit represented by the formula (1-4) is preferred.

$-[CF_2-CF(-O-R^{f1}-SO_2M)]-$      Formula (1-1)

$-[CF_2-CF(-R^{f1}-SO_2M)]-$      Formula (1-2)

Formula (1-3)

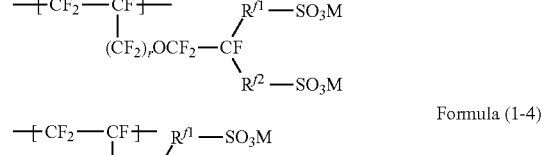

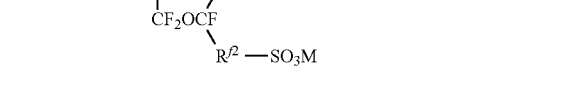
Formula (1-4)

$R^{f1}$ is a perfluoroalkylene group which may contain an oxygen atom between carbon atoms. The number of carbon atoms in the perfluoroalkylene group is preferably at least 1, more preferably at least 2, and preferably at most 20, more preferably at most 10.

$R^{f2}$ is a single bond or a perfluoroalkylene group which may contain an oxygen atom between carbon atoms. The number of carbon atoms in the perfluoroalkylene group is preferably at least 1, more preferably at least 2, and preferably at most 20, more preferably at most 10.

r is 0 or 1.

M is a hydrogen atom, an alkali metal or a quaternary ammonium cation.

As the unit represented by the formula (1-1) and the unit represented by the formula (1-2), the unit represented by the formula (1-5) is more preferred.

—[CF$_2$—CF(—(CF$_2$)$_x$—(OCF$_2$CFY)$_y$—O—(CF$_2$)$_z$—SO$_3$M)]—     Formula (1-5):

x is 0 or 1, y is an integer of from 0 to 2, z is an integer of from 1 to 4, and Y is F or CF$_3$. M is as described above.

Specific examples of the unit represented by the formula (1-1) include the following units. In the formulae, w is an integer of from 1 to 8, and x is an integer of from 1 to 5. The definition of M in the formulae is as described above.

—[CF$_2$—CF(—O—(CF$_2$)$_w$—SO$_3$M)]—

—[CF$_2$—CF(—O—CF$_2$CF(CF$_3$)—O—(CF$_2$)$_w$—SO$_3$M)]—

—[CF$_2$—CF(—(O—CF$_2$CF(CF$_3$))$_x$—SO$_3$M)]—

Specific examples of the unit represented by the formula (1-2) include the following units. In the formulae, w is an integer of from 1 to 8. The definition of M in the formulae is as described above.

—[CF$_2$—CF(—(CF$_2$)$_w$—SO$_3$M)]—

—[CF$_2$—CF(—CF$_2$—O—(CF$_2$)$_w$—SO$_3$M)]—

As the unit represented by the formula (1-3), a unit represented by the formula (1-3-1) is preferred. The definition of M in the formula is as described above.

$$-\!\!\left[\mathrm{CF_2-CF}\right]\!\!- \quad\quad \begin{array}{c} \diagup \mathrm{OCF_2R^{f3}-SO_3M} \\ (\mathrm{CF_2})_r\mathrm{OCF_2-CF} \\ \diagdown \mathrm{R^{f4}-SO_3M} \end{array}$$ Formula (1-3-1)

R$^{f3}$ is a C$_{1-6}$ linear perfluoroalkylene group, and R$^{f4}$ is a single bond or a C$_{1-6}$ linear perfluoroalkylene group which may contain an oxygen atom between carbon atoms. The definitions of r and M are as described above.

Specific examples of the unit represented by the formula (1-3) include the following.

$$-\!\!\left[\mathrm{CF_2-CF}\right]\!\!- \quad\quad \begin{array}{c} \diagup \mathrm{OCF_2CF_2-SO_3H} \\ \mathrm{OCF_2-CF} \\ \diagdown \mathrm{CF_2CF_2-SO_3H} \end{array}$$

$$-\!\!\left[\mathrm{CF_2-CF}\right]\!\!- \quad\quad \begin{array}{c} \diagup \mathrm{OCF_2CF_2-SO_3H} \\ \mathrm{OCF_2-CF} \\ \diagdown \mathrm{CF_2OCF_2CF_2-SO_3H} \end{array}$$

$$-\!\!\left[\mathrm{CF_2-CF}\right]\!\!- \quad\quad \begin{array}{c} \diagup \mathrm{OCF_2CF_2-SO_3H} \\ \mathrm{CF_2OCF_2-CF} \\ \diagdown \mathrm{CF_2OCF_2CF_2-SO_3H} \end{array}$$

A specific example of the unit represented by the formula (1-4) is the following.

$$-\!\!\left[\mathrm{CF_2-CF}\right]\!\!- \quad\quad \begin{array}{c} \diagup \mathrm{CF_2-SO_3H} \\ \mathrm{CF_2OCF} \\ \diagdown \mathrm{CF_2-SO_3H} \end{array}$$

As the unit having a sulfonic acid type functional group and a fluorine atom, one type may be used alone, or two or more types may be used in combination.

The fluorinated polymer (S) preferably has an ether bond site in its side chain, and particularly preferably an ether bond contained in the side chain having a sulfonic acid type functional group as described above.

In a case where the fluorinated polymer (S) has an ether bond site in the side chain, the monomer that brings bout the ether bond site is preferably a monomer having a sulfonic acid type functional group via an ether bond in the side chain of the fluorinated polymer (S). Among them, at least one type of monomer selected from the group consisting of the following monomers (A) to (E) is preferred.

CF$_2$=CF—O—CF$_2$CF(CF$_3$)—O—CF$_2$CF$_2$—SO$_2$F     (A)

CF$_2$=CF—O—CF$_2$CF(CF$_2$O—CF$_2$CF$_2$—SO$_2$F)     (B)
                                                                          —O—CF$_2$CF$_2$—SO$_2$F

CF$_2$=CF—CF$_2$—O—CF$_2$CF(CF$_2$—SO$_2$F)     (C)
                                                —CF$_2$—SO$_2$F

CF$_2$=CF—CF$_2$—O—CF$_2$CF$_2$—SO$_2$F     (D)

CF$_2$=CF—O—CF$_2$CF$_2$—SO$_2$F     (E)

The fluorinated polymer (S) may contain a unit based on another monomer other than a unit based on a fluorinated olefin and a unit having a sulfonic acid type functional group and a fluorine atom.

Specific examples of another monomer include CF$_2$=CFR$^{f5}$ (where R$^{f5}$ is a C$_{2-10}$ perfluoroalkyl group), CF$_2$=CF—OR$^{f6}$ (where R$^{f6}$ is a C$_{1-10}$ perfluoroalkyl group), CF$_2$=CFO(CF$_2$)$_v$CF=CF$_2$ (where v is an integer of from 1 to 3).

The content of the unit based on another monomer is, from the viewpoint of maintaining ion exchange performance, preferably at most 30 mass % to all units in the fluorinated polymer (S).

The wet ion exchange membrane may have a single-layer structure or a multi-layer structure. In the case of a multi-layer structure, for example, an embodiment may be mentioned in which a plurality of layers containing a fluorinated polymer (S) and having different ion exchange capacities or units are laminated. Further, as described above, a layer of the fluorinated polymer (C) may be laminated.

Further, the wet ion exchange membrane may contain a reinforcing material inside or at the surface thereof. That is, the wet ion exchange membrane may be in a mode containing the fluorinated polymer (S) swollen by the liquid medium and the reinforcing material.

The reinforcing material is preferably a member derived from a reinforcing cloth (preferably woven cloth). In addition to the reinforcing cloth, fibrils and porous materials may be mentioned as the reinforcing material.

The reinforcing cloth is composed of warp yarns and weft yarns, and the warp yarns and the weft yarns are preferably orthogonal to each other. Further, the reinforcing cloth is preferably composed of a reinforcing yarn and a sacrificial yarn.

The reinforcing yarn is preferably a yarn made of a material that does not elute even when the reinforcing cloth is immersed in an alkaline aqueous solution (for example, a sodium hydroxide aqueous solution having a concentration of 32 mass %). Specifically, the reinforcing yarn is preferably at least one type of reinforcing yarn selected from the group consisting of a reinforcing yarn made of polytetrafluoroethylene (hereinafter referred to also as PTFE), a reinforcing yarn made of a tetrafluoroethylene-perfluoroether copolymer (hereinafter referred to also as PFA; as the perfluoroether, perfluoroalkyl vinyl ether is preferred), a reinforcing yarn made of polyphenylene sulfide (hereinafter referred to also as PPS), a reinforcing yarn made of polyether ether ketone (hereinafter referred to also as PEEK), a reinforcing yarn made of nylon and a reinforcing yarn made of polypropylene.

The sacrificial yarn is a yarn of which at least a part is eluted under the operating environment of the apparatus including the ion exchange membrane, and is preferably a yarn made of a material that is eluted in the alkaline aqueous solution when the reinforcing cloth is immersed in the alkaline aqueous solution. The sacrificial yarn may be a monofilament composed of one filament or a multifilament composed of two or more filaments.

At the time of production of the wet ion-exchange membrane and during handling such as when mounting the ion-exchange membrane on a battery, the strength of the ion exchange membrane is maintained by the sacrificial yarn, but, in the operating environment of the battery, the sacrificial yarn will be dissolved, whereby the resistance of the membrane decreases.

Further, an inorganic particle layer comprising inorganic particles and a binder may be provided on the surface of the wet ion exchange membrane. The inorganic particle layer is preferably provided on at least one surface of the wet ion exchange membrane, and more preferably provided on both surfaces.

When the wet ion exchange membrane has the inorganic particle layer, the hydrophilicity of the ion exchange membrane will be improved and the ionic conductivity will be improved.

(Method for Production of Wet Ion Exchange Membrane)

The wet ion exchange membrane is obtainable, for example, by a known method described in WO2018/070444. That is, a monomer having a group capable of being converted to a sulfonic acid type functional group is polymerized to obtain a fluorinated polymer having a group capable of being converted to a sulfonic acid type functional group. The fluorinated polymer is formed into a membrane to obtain a membrane of the fluorinated polymer having a group capable of being converted to a sulfonic acid type functional group (hereinafter referred to also as a "precursor membrane"), and then the group capable of being converted to an acid-type functional group in the precursor membrane is hydrolyzed and converted to a sulfonic acid-type functional group for production. After being hydrolyzed, depending on the application, the counterion of the sulfonic acid type functional group may be converted to hydrogen, sodium, potassium or the like.

In a case where the wet ion exchange membrane is a laminate, a plurality of precursor membranes may be prepared, laminated and then hydrolyzed. Further, in a case where the wet ion exchange membrane contains a reinforcing material, at the time of laminating the precursor membranes, the reinforcing material may also be laminated between the precursor membranes.

The ion exchange membrane after the hydrolysis or counterion exchange is usually wet with the medium used for the hydrolysis or counterion exchange, the water used for the subsequent washing, etc. The ion exchange membrane in the wet state may be used as it is, as a wet ion exchange membrane for drying.

In the production method of the present invention, it is preferred that the content of the liquid medium in the wet ion exchange membrane is higher. The higher the degree of swelling of the fluorinated polymer (S) by the liquid medium, the higher the dimensional stability in the in-plane direction of the ion exchange membrane. The degree of swelling of the fluorinated polymer (S) by the liquid medium may be affected by the polymer structure of the fluorinated polymer (S), the ion exchange capacity, the type of counter ion of the sulfonic acid type functional group, the membrane construction of the wet ion exchange membrane, etc., and, for example, as the ion exchange capacity is higher, the swelling degree of the fluorinated polymer (S) tends to be higher. Although affected by these conditions, in order to obtain such a higher effect, the content of the liquid medium in the wet ion exchange membrane is preferably at least 30 mass %, more preferably at least 40 mass %, further preferably at least 50 mass %, to the total mass of the wet ion exchange membrane.

It is assumed that this is because the fluorinated polymer (S) was dried from a state in which the degree of swelling was further increased so that the internal stress was further relaxed, whereby the internal stress remaining by the drying in the dry ion exchange membrane was further reduced.

As described above, the ion exchange membrane in a wet state after the hydrolysis or counterion exchange may be used as it is as a wet ion exchange membrane, but, it is preferred to carry out an operation for increasing the content of the liquid medium, since it is easy to obtain a wet ion exchange membrane having a high content of the liquid medium. Such an operation may, for example, be a method, such as a method of heating while contacting with a liquid medium, a method of immersing in a liquid medium having a higher affinity for the fluorinated polymer (S) for a certain period of time, etc., but, since the operation is simple, the method of heating while contacting with the liquid medium (hereinafter referred to as "contact heat treatment") is preferred.

An ion exchange membrane to be used for the contact heat treatment (hereinafter referred to also as an "untreated membrane") may be a wet ion exchange membrane after the hydrolysis or counterion exchange, or may be a dried ion exchange membrane.

The method of contacting the untreated film with the liquid medium may, for example, be a method of immersing the untreated film in the liquid medium, or a method of applying the liquid medium to the untreated film.

The heating temperature in the contact heat treatment is preferably at least 60° C., more preferably at least 90° C., since the liquid medium will be more likely to penetrate into the untreated membrane. Further, the heating temperature is preferably at most the volatilization temperature (boiling point) of the liquid medium.

The contact heat treatment time may be suitably adjusted, for example, so that the content of the liquid medium in the untreated film falls within the above mentioned range.

<Method for Drying Wet Ion Exchange Membrane>
(Drying Step)

In the present production method, a step (hereinafter referred to also as "drying step") of drying the wet ion exchange membrane to remove the liquid medium to obtain a dry ion exchange membrane, is performed so that the dimensional change of the dry ion exchange membrane from the wet ion exchange membrane will be at least −5% in the MD direction and the TD direction, respectively. Further, in the following, the "dimensional change of the dry ion exchange membrane from the wet ion exchange membrane during the drying step" may be abbreviated as the "dimensional change of the wet ion exchange membrane before and after drying".

The dimensional changes in the MD direction and the TD direction of the wet ion exchange membrane before and after drying can be calculated by the following formulas in the respective directions.

Dimensional change (%) of wet ion exchange membrane=100×{(length of dry ion exchange membrane)−(length of wet ion exchange membrane)}/(length of wet ion exchange membrane)    Formula 1

The dimensional changes in the MD direction and the TD direction of the wet ion exchange membrane before and after drying are respectively at least −5%, and it is preferred that the shrinkage is small, but even when there is no dimensional change or when the membrane is stretched while drying, an ion exchange membrane excellent in dimensional change in the in-plane direction may be obtainable. As a specific preferred dimensional change, at least 0% is preferred, at least 5% is more preferred, at least 10% is particularly preferred, and at least 20% is most preferred.

In a case where the dimensional change exceeds 0%, that is, in the case of stretching, the upper limit of the dimensional change is not particularly limited so long as the ion exchange membrane is not damaged such as being broken, but, if the film thickness becomes too thin, the strength decreases, and therefore, the dimensional changes in the MD direction and the TD direction of the wet ion exchange membrane before and after drying are, respectively, preferably at most 250%, more preferably at most 200%, further preferably at most 150%, particularly preferably at most 50%.

The method for keeping the dimensional changes in the MD direction and the TD direction of the wet ion exchange membrane before and after drying within the above range, may, for example, be a method of drying while binding the periphery of the wet ion exchange membrane (for example, a method of fixing by sandwiching the periphery of the wet ion exchange membrane with a metal frame, or a method of fixing by sticking a needle around the periphery of the wet ion exchange membrane), and a method of applying a load around the periphery of the wet ion exchange membrane.

Here, the production of the dry ion exchange membrane may be carried out roll-to-roll. In such a case, a long roll-shaped wet ion exchange membrane is unwound, and after performing each step of the present production method, the dry ion exchange membrane is wound up in a roll shape. At that time, the dimensional change in the MD direction during drying of the wet ion exchange membrane can also be controlled by, for example, adjusting the winding speed of the dry ion exchange membrane.

Drying of the wet ion exchange membrane may be natural drying or may be carried out by using a known drying device, but drying by heating is preferred from the viewpoint of drying efficiency.

In a case of conducting heating at the time of drying the wet ion exchange membrane, the heating temperature of the wet ion exchange membrane is preferably from 50 to 300° C., more preferably from 90 to 280° C.

In particular, the heating temperature of the wet ion exchange membrane is, since the internal stress during drying is small, preferably a temperature of at least the softening point of the fluorinated polymer (S), more preferably a temperature higher by at least 10° C. than the softening point of the fluorinated polymer, particularly preferably a temperature higher by at least 20° C. than the softening point of the fluorinated polymer (S).

The softening point of the fluorinated polymer (S) is measured by the method as described later in the section for Examples.

[Ion Exchange Membrane]

The ion exchange membrane of the present invention is an ion exchange membrane containing a fluorinated polymer having a group represented by —$SO_3M$ and, in the main chain, a group represented by —$CF_2$—.

Further, in a case where, by Raman spectroscopy, to a cross section in the thickness direction of the ion exchange membrane, polarized light orthogonal to the thickness direction is irradiated to obtain a spectrum chart, whereby the ratio of the peak area a2 of Raman shift 680 to 760 $cm^{-1}$ to the peak area a1 of Raman shift 1,025 to 1,095 $cm^{-1}$ is taken as A1, and by Raman spectroscopy, to a cross section in the thickness direction of the ion exchange membrane, polarized light parallel to the thickness direction is irradiated to obtain a spectrum chart, whereby the ratio of the peak area b2 of Raman shift 680 to 760 $cm^{-1}$ to the peak area b1 of Raman shift 1,025 to 1,095 $cm^{-1}$ is taken as B1, the ratio of said B1 to said A1 is at least 1.05.

Here, the peak existing in a range of Raman shift 1,025 to 1,095 $cm^{-1}$ is considered to be the peak derived from the above-mentioned group represented by —$SO_3M$, and the peak existing in a range of Raman shift 680 to 760 $cm^{-1}$ is considered to be the peak derived from the above-mentioned group represented by —$CF_2$— present in the main chain. Further, M in the group represented by —$SO_3M$, represents a hydrogen atom, an alkali metal or a quaternary ammonium cation, and among them, a hydrogen atom, a sodium atom or a potassium atom is preferred.

The ion exchange membrane of the present invention is excellent in dimensional stability in the in-plane direction, when installed in a tank and immersed in an electrolytic solution. The reason for this is unknown in detail, but it is assumed as follows.

The group represented by —$CF_2$— is a group constituting the main chain of the fluoropolymer. The C—F bond of the group represented by —$CF_2$— is located in the direction orthogonal to the direction in which the main chain of the fluorinated polymer is oriented. The peak derived from —$CF_2$— as measured by Raman spectroscopy is due to the stretching vibration of C—F.

Here, with reference to FIG. 1, the relationship between the irradiation direction by Raman spectroscopy and the orientation method of the fluorinated polymer will be specifically described. In the example in FIG. 1, the main chain M1 of the fluorinated polymer is oriented along the direction 12A orthogonal to the thickness direction T of the ion exchange membrane 10. In this case, by measuring by the polarized light PB along the direction 12B parallel to the thickness T rather than by the polarized light PA along the direction 12A orthogonal to the thickness direction T, it is considered that the scattering efficiency of the peak derived from the group represented by —$CF_2$— present in the main chain, becomes to be high.

That is, the ratio of said B1 to said A1 being at least 1.05 means that the main chain of the fluorinated polymer tends to be oriented along the direction orthogonal to the thickness direction of the ion exchange membrane. As a result, when the ion exchange membrane is dipped in the electrolytic solution, expansion and contraction in the orientation direction of the main chain (the in-plane direction of the ion exchange membrane) become to be small, whereby it is considered that dimensional stability in the in-plane direction will be excellent.

In the ion exchange membrane of the present invention, the ratio of B1 to A1 (B1/A1) is at least 1.05, and, from the viewpoint that the dimensional stability of the ion exchange membrane in the in-plane direction will be more excellent, preferably at least 1.10, more preferably at least 1.13, particularly preferably at least 1.25.

The above ratio (B1/A1) is not particularly limited, but is usually preferably at most 3.00, more preferably at most 2.00.

The ion exchange membrane of the present invention can be produced, for example, by the method for producing a dry ion exchange membrane of the present invention as described above.

The content of the liquid medium in the ion exchange membrane of the present invention is preferably at most 15 mass %, more preferably at most 12 mass %, particularly preferably at most 10 mass %, to the total mass of the ion exchange membrane. The lower limit may be 1 mass %. When the content of the liquid medium is within this range, the ion exchange membrane will be excellent in handling efficiency.

The thickness of the ion exchange membrane of the present invention is, from the viewpoint of maintaining a constant strength, preferably at least 20 μm, particularly preferably at least 40 μm, and, from the viewpoint of improving the current efficiency and voltage efficiency, preferably at most 300 μm, particularly preferably at most 200 μm.

As a specific example of the fluorinated polymer contained in the ion exchange membrane of the present invention, the fluorinated polymer (S) mentioned in the above method for producing a dry ion exchange membrane may be mentioned. Specific examples and preferred embodiments of the fluorinated polymer are the same as those of the fluorinated polymer (S) as mentioned in the above method for producing a dry ion exchange membrane.

The ion exchange membrane of the present invention may have a single-layer structure or a multi-layer structure, may contain a reinforcing material, and may have an inorganic fine particle layer on its surface. These constructions and preferred embodiments are the same as those of the wet membrane in the method for producing a dry ion exchange membrane.

<Characteristics of Ion Exchange Membrane>

The calculation method of the above-mentioned A1 which is calculated based on a spectrum chart obtained by Raman spectroscopy as one of the characteristics of the ion exchange membrane of the present invention, will be described in detail with reference to FIG. 2 and FIG. 3.

Figure 2:
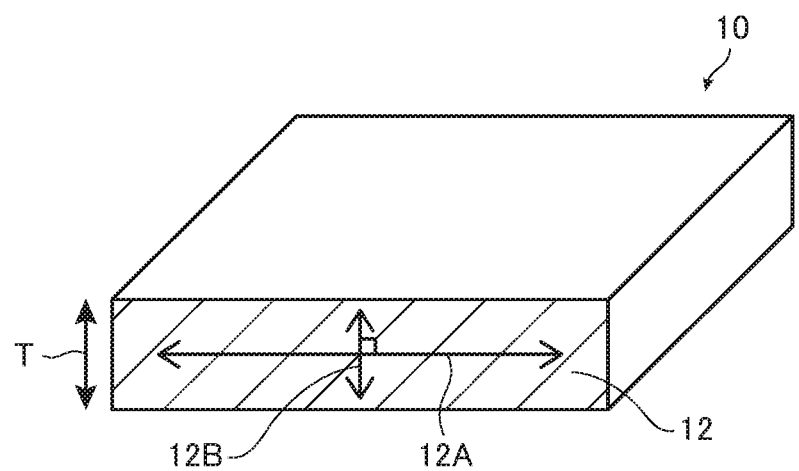
FIG. 2 is a diagram for illustrating a measuring method by Raman spectroscopy.

FIG. 2 is a diagram for illustrating the measuring method by Raman spectroscopy.

Figure 3:
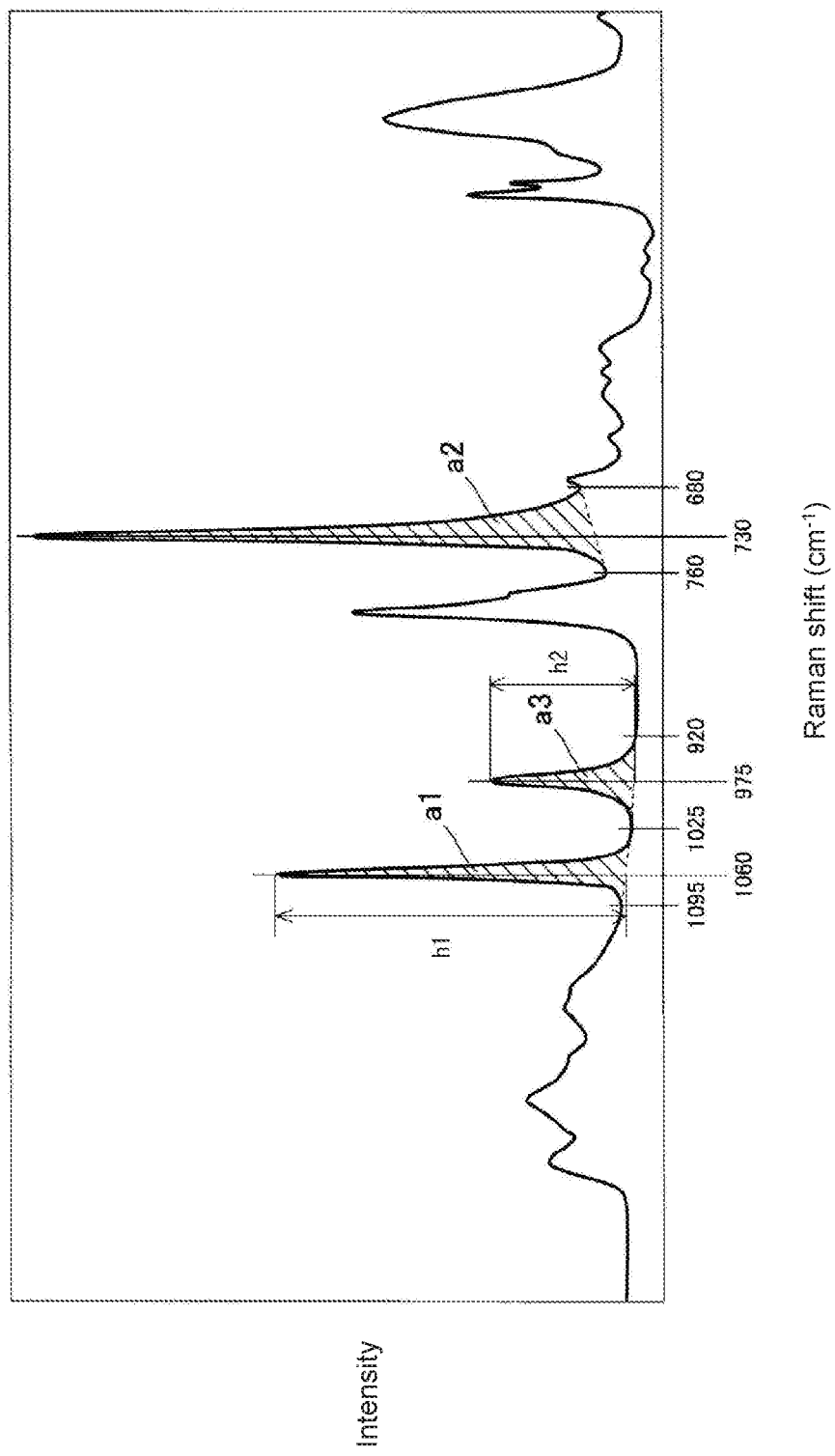
FIG. 3 is an example of a spectrum chart obtainable in a case where polarized light is irradiated to a cross section in the thickness direction of an ion exchange membrane in a direction orthogonal to the thickness direction.

Further, FIG. 3 is an example of a spectrum chart obtainable when polarized light is irradiated to a cross section in the thickness direction of the ion exchange membrane in a direction orthogonal to the thickness direction.

In calculating said A1, firstly the ion exchange membrane 10 is cut along the axial direction parallel to the thickness direction T of the ion exchange membrane 10 to expose a cross section 12 of the ion exchange membrane 10. The method for exposing the cross section of the ion exchange membrane may, for example, be a cutting method using a razor or the like. Next, to the cross-section 12, polarized light is irradiated in a direction 12A orthogonal to the thickness direction T, whereby the spectrum chart shown in FIG. 3 is obtained by Raman spectroscopic analysis. The light to be irradiated to the ion exchange film 10 is a laser light having a wavelength of 532 nm. The light to be irradiated to the ion exchange membrane 10 is linearly polarized light, and specifically, it is obtainable by using a polarizer.

For the measurement by Raman spectroscopy, for example, a Raman spectroscope (product name "LabRAM HR-800", manufactured by Horiba Ltd.) is used.

In the spectrum chart shown in FIG. 3, the vertical axis represents the intensity (Raman scattering intensity) and the horizontal axis represents Raman shift ($cm^{-1}$).

In the present invention, the peak area a1 within a range of Raman shift 1,025 to 1,095 $cm^{-1}$ is used. In the example in FIG. 3, at the position of Raman shift 1,060 $cm^{-1}$, a peak exists, but the peak area was obtained, as shown in FIG. 3, by preparing a baseline connecting two points i.e. a point (coordinate) representing the intensity at 1,025 $cm^{-1}$ and a point (coordinate) representing the intensity at 1,095 $cm^{-1}$, and calculating the area of the region surrounded by the baseline and the spectrum within the range of Raman shift 1,025 to 1,095 $cm^{-1}$.

In the present invention, the peak area a2 within a range of Raman shift 680 to 760 $cm^{-1}$ is used. In the example in FIG. 3, at the position of Raman shift 730 $cm^{-1}$, a peak exists, but the peak area was obtained, as shown in FIG. 3, by preparing a baseline connecting two points i.e. a point (coordinate) representing the intensity at 680 $cm^{-1}$ and a point (coordinate) representing the intensity at 760 $cm^{-1}$, and calculating the area of the region surrounded by the baseline and the spectrum within the range of Raman shift 680 to 760 $cm^{-1}$.

Based on the values thus obtained, A1 (a2/a1) being the ratio of the peak area a2 to the peak area a1 is calculated.

As described above, A1 value calculated from the spectrum measured by irradiating to the cross section 12 in the thickness direction T of the ion exchange membrane 10, polarized light in the direction 12A orthogonal to the thickness direction T. Therefore, A1 is considered to become an index showing that the C—F bond of the group represented by —$CF_2$— existing in the main chain is oriented along the direction 12A orthogonal to the thickness direction T of the ion exchange membrane 10, and the main chain (C—C bond) is oriented along the thickness direction T of the ion exchange membrane 10. That is, when the main chain is oriented along the thickness direction T of the ion exchange membrane 10, it is considered that the value of A1 becomes large.

On the other hand, the above B1 (b2/b1) is calculated in the same manner as the above A1 except that a spectrum chart obtained by irradiating to the cross section in the thickness direction of the ion exchange membrane, polarized light parallel to the thickness direction, is used. Specifically, in the example in FIG. 2, B1 is a value calculated from a spectrum measured by irradiating to the cross section 12, polarized light in a direction 12B parallel to the thickness direction T. Therefore, B1 is considered to become an index showing that the C—F bond of the group represented by —$CF_2$— existing in the main chain is oriented along the direction 12B parallel to the thickness direction T of the ion exchange membrane 10, and the main chain (C—C bond) is oriented along the direction 12A orthogonal to the thickness direction T of the ion exchange membrane 10. That is, when the main chain is oriented along the direction 12A orthogonal to the thickness direction T of the ion exchange membrane 10, it is considered that the value of B1 becomes large.

Therefore, it is considered that the higher the ratio of B1 to A1 (B1/A1) is, the more the main chain of the fluorinated polymer is oriented in the direction orthogonal to the thickness direction of the ion exchange membrane. Therefore, when the ion exchange membrane is dipped in the electrolytic solution, expansion and contraction in the orientation direction of the main chain (in-plane direction of the ion exchange membrane) becomes small, and it is considered that dimensional stability in the in-plane direction will be excellent.

By using the peak area as an orientation parameter, it is possible to reduce the influence of variations due to noise in the spectrum.

The fluorinated polymer contained in the ion exchange membrane of the present invention preferably further has an ether bond site (specifically a partial bond represented by C—O—C) in its side chain. In such a case, the ion exchange membrane of the present invention preferably satisfies the following characteristics.

That is, in a case where the ratio of the peak area a3 of Raman shift 920 to 1,025 $cm^{-1}$ to the peak area a1 is taken A2, and the ratio of the peak area b3 of Raman shift 920 to 1,025 $cm^{-1}$ to the peak area b1 is taken as B2, the ratio of B2 to A2 (B2/A2) is preferably larger than 1.05, more preferably at least 1.10, particularly preferably at least 1.15.

When the ratio (B2/A2) is larger than 1.05, the dimensional stability in the in-plane direction of the ion exchange membrane will be more excellent.

The ratio (B2/A2) is not particularly limited, but is usually preferably at most 3.00, more preferably at most 2.00.

Here, the peak existing in the range of Raman shift 920 to 1,025 $cm^{-1}$ is considered to be the peak derived from the ether bond site existing in the side chain.

In a case where the fluorinated polymer contained in the ion exchange membrane of the present invention has an ether bond site in the side chain, it is preferred to use the peak area a3 within a range of Raman shift 920 to 1,025 $cm^{-1}$. In the example in FIG. 3, at the position of Raman shift 975 $cm^{-1}$, a peak exists, but the peak area was obtained, as shown in FIG. 3, by preparing a base line connecting two points, i.e. a point (coordinate) representing the intensity at 920 $cm^{-1}$ and a point (coordinate) representing the intensity at 1,025 $cm^{-1}$, and calculating the area of the region surrounded by the baseline and the spectrum within a range of Raman shift 920 $cm^{-1}$ to 1,025 $cm^{-1}$.

The peak area a3 is calculated based on a spectrum chart obtained by Raman spectroscopy by irradiating to a cross section in the thickness direction of the ion exchange membrane, polarized light orthogonal to the thickness direction. Based on the value thus obtained, A2 (a3/a1) being the ratio of the peak area a1 to the peak area a3 is calculated.

The peak area b3 is calculated based on a spectrum chart obtained by Raman spectroscopy by irradiating to a cross section in the thickness direction of the ion exchange membrane, polarized light parallel to the thickness direction. Based on the value thus obtained, B2 (b3/b1) being the ratio of the peak area b1 to the peak area b3, is calculated.

In a case where the fluorinated polymer contained in the ion exchange membrane of the present invention has an ether bond site in the side chain, it is preferred to use a peak area b3 within a range of Raman shift 920 to 1,025 $cm^{-1}$.

As described above, A2 is a value calculated by irradiating to the cross section in the thickness direction of the ion exchange membrane, polarized light orthogonal to the thickness direction, and therefore, in a case where an ether bond site exists in a side chain of the fluorinated polymer, it is an index showing that the main chain of the fluorinated polymer is oriented along the direction parallel to the thickness direction. More specifically, in the case where the fluorinated polymer has a side chain containing an ether bond site, the side chain is likely to be easily oriented along the direction orthogonal to the main chain (particularly the unit represented by the formula (1) is likely to show this tendency). Therefore, in a case where the main chain existing in the direction orthogonal to the side chain of the fluorinated polymer is oriented in the direction parallel to the thickness direction of the ion exchange membrane, the value of A2 is considered to be large.

On the other hand, B2 is a value calculated by irradiating to the cross section in the thickness direction of the ion exchange membrane, polarized light in a direction parallel to the thickness direction, and therefore, in a case where the ether bond site is present in the side chain of the fluorinated polymer, it is an index showing that the main chain of the fluorinated polymer is oriented along the direction orthogonal to the thickness direction. Therefore, in a case where the main chain existing in the direction orthogonal to the side chain of the fluorinated polymer is oriented in the direction orthogonal to the thickness direction of the ion exchange membrane, the value of B2 is considered to be large.

That is, it is considered that as the ratio of B2 to A2 (B2/A2) becomes larger than 1.05, the tendency that the main chain of the fluorinated polymer is oriented in the direction orthogonal to the thickness direction of the ion exchange membrane, becomes stronger. Therefore, in a case where the ion exchange membrane is dipped in an electrolytic solution, expansion and contraction in the orientation direction of the main chain (in-plane direction of the ion exchange membrane) will become small, and it is considered that dimensional stability in the in-plane direction will be excellent.

In a case where the fluorinated polymer contained in the ion exchange membrane of the present invention has an ether bond site in the side chain, the ion exchange membrane of the present invention preferably satisfies the following characteristics.

Further, in a case where by Raman spectroscopy, to a cross section in the thickness direction of the ion-exchange membrane, polarized light orthogonal to the thickness direction is irradiated to obtain a spectrum chart, whereby the ratio of the height h2 of the highest peak existing within a range of Raman shift 920 to 1,025 $cm^{-1}$ to the height h1 of the highest peak existing within a range of Raman shift 1,025 to 1,095 $cm^{-1}$ is taken as H1, and By Raman spectroscopy, to a cross section in the thickness direction of the ion exchange membrane, polarized light parallel to the thickness direction is irradiated to obtain a spectrum chart, whereby the ratio of the height h4 of the highest peak existing within a range of Raman shift 920 to 1,025 $cm^{-1}$ to the height h3 of the highest peak existing within a range of Raman shift 1,025 to 1,095 $cm^{-1}$ is taken as H2, the ratio of said H2 to said H1 (H2/H1) is preferably at least 1.05, more preferably at least 1.1, particularly preferably at least 1.15.

When the ratio (H2/H1) is made to be at least 1.05, the dimensional stability of the ion exchange membrane in the in-plane direction will be more excellent. The ratio (H2/H1) is not particularly limited, but is usually preferably at most 3.00, more preferably at most 2.00.

Here, as described above, the peak existing within a range of Raman shift 1,025 to 1,095 cm$^{-1}$ is considered to be the peak derived from the above-mentioned group represented by —$SO_3M$, and the peak existing within a range of Raman shift 920 to 1,025 cm$^{-1}$ is considered to be the peak derived from the above-mentioned ether bond site present in the side chain.

It is considered that H1 and H2 are considered to also reflect the orientations of the polymer main chain and side chain similarly to A2 and B2, and it is considered that as the value of the ratio of H2 to H1 (H2/H1) is larger, the main chain of the fluorinated polymer tends to be more likely to be oriented in a direction orthogonal to the thickness direction of the ion exchange membrane. Therefore, in a case where the ion exchange membrane is dipped in an electrolytic solution, expansion and contraction in the orientation direction of the main chain (in-plane direction of the ion exchange membrane) tend to become small, whereby it is considered that dimensional stability in the in-plane direction will be excellent.

To obtain the height of a peak, a baseline is prepared in the same procedure as at the time of obtaining the peak area as described above, and a vertical line is drawn from the apex of the peak, of which the height is desired to be obtained, toward the baseline, whereby the length of the vertical line from the baseline to the apex of the peak is taken as the height of the peak. Specifically, in the example in FIGS. 3, h1 and h2 correspond to the heights of the peaks. Based on the values obtained in this way, H1 (h2/h1) being the ratio of the peak height h2 to the peak height h1, is calculated. In the same manner, h3, h4 and H2 are obtained.

By using the peak height as an orientation parameter, it is possible to reduce the influence of the case where the peak is split or broadened depending on the structure of the side chain.

The ion exchange membrane of the present invention and the dry ion exchange membrane obtained by the present production method can be used in various batteries, electrolysis processes and separation processes.

Specific examples of their applications include various battery applications such as solid polymer fuel cells, direct methanol fuel cells, redox flow batteries, air batteries, etc., solid polymer water electrolysis, alkaline water electrolysis, ozone water electrolysis, salt electrolysis, organic electrolysis, and various electrolyzers of chlorides or oxides. In addition to the above-mentioned applications, they are used as separators or solid electrodes in various types of electrochemical cells, for selective cation transport at the binding portions of the cells. In addition to the electrochemical-related applications, they are also used as sensor applications for various gas sensors, biosensors, light-emitting devices, optical devices, organic matter sensors, carbon nanotube solubilization, actuators, catalyst applications, etc.

EXAMPLES

In the following, the present invention will be described in detail with reference to Examples. However, the present invention is not limited to these Examples. Here, the blend amounts of the respective components in the Table given later are based on mass.

[Membrane Thickness of Each Membrane]

The membrane thickness of each membrane was obtained by observing a cross section of each membrane by an optical microscope and using an image analysis software.

[Ion Exchange Capacity of Fluorinated Polymer]

A fluorinated polymer was left for 24 hours in a glove box in which dry nitrogen was flowed, whereupon the dry mass of the fluorinated polymer was measured. Then, the fluorinated polymer was immersed in a 2 mol/L sodium chloride aqueous solution at 60° C. for 1 hour. After the fluorinated polymer was washed with ultrapure water, it was taken out, and the liquid in which the fluorinated polymer was immersed was titrated with a 0.1 mol/L sodium hydroxide aqueous solution to obtain the ion exchange capacity (AR) of the fluorinated polymer.

[Softening Point of Fluorinated Polymer]

The softening point of the fluorinated polymer was measured by the following procedure using a dynamic viscoelasticity measuring device. First, using a dynamic viscoelasticity measuring device (DVA-225 manufactured by ITK Co., Ltd.), dynamic viscoelasticity measurement was conducted under the conditions of the tensile mode with sample width: 5.0 mm, grip length: 15 mm, measurement frequency: 1 Hz, heating rate: 2° C./min. Next, tan δ (loss tangent) was calculated from the ratio (E"/E') of the loss elastic modulus E" to the storage elastic modulus E', and a tan δ-temperature curve was prepared. From the prepared tan δ-temperature curve, the peak temperature between −100 and 300° C. was read, and the value was taken as the softening point.

[Content of Liquid Medium in Wet Ion Exchange Membrane]

The content of the liquid medium contained in the wet ion exchange membrane was calculated by the following formula based on the mass of the membrane after drying from 0.6 to 0.7 g of the wet ion exchange membrane at 90° C. for 16 hours and the mass of the wet ion exchange membrane before drying.

Content (mass %) of liquid medium contained in the wet ion exchange membrane=100×{(mass of wet ion exchange membrane before drying)−(mass of membrane after drying)}/(mass of membrane after drying)

[Dimensional Change of Wet Ion Exchange Membrane Before and After Drying]

The dimensional change of the wet ion exchange membrane before and after drying in the MD direction and the TD direction was calculated by the above-described formula 1.

Here, the lengths in the MD and TD directions of the wet ion exchange membrane and the lengths in the MD and TD directions of the dry ion exchange membrane mean the following values.

A line A (16 cm in length) parallel to the MD direction of the wet ion exchange membrane was drawn so as to pass through the center point in the plane of the wet ion exchange membrane (square of 20 cm in the MD direction×20 cm in the TD direction), and a line B (length 16 cm) parallel to the TD direction orthogonal to the line A was drawn. The length of the line A at that time was taken as the length in the MD direction of the wet ion exchange membrane, and the length of the line B was taken as the length in the TD direction of the wet ion exchange membrane.

Further, the length of the line A after completion of the drying of the wet ion exchange membrane was taken as the length in the MD direction of the dry ion exchange membrane, and the length of the line B after completion of the drying of the wet ion exchange membrane was taken as the length in the TD direction of the dry ion exchange membrane.

[Change Rate of Membrane Area of Dry Ion Exchange Membrane Before and After Immersion in Water]

The change rate (%) of membrane area before and after immersing the dry ion exchange membrane in water was calculated by the following formula 2. Here, the temperature of the water to be immersed was set to be room temperature (23° C.) or 100° C., and in each case, the rate of change of the membrane area was measured. The immersion time in water was 1 hour.

Change rate (%) of membrane area before and after immersion in water=100×{(area of ion exchange membrane after immersion)−(area of dry ion exchange membrane)}/(area of dry ion exchange membrane)    Formula 2

Here, the area of the dry ion exchange membrane means a value calculated as follows. A line E (16 cm in length) parallel to the longitudinal direction (MD direction) of the dry ion exchange membrane is drawn so as to pass through the center point in the plane of the dry ion exchange membrane (square of length 20 cm×width 20 cm), and a line F (length 16 cm) parallel to the lateral direction (TD direction) orthogonal to the line E is drawn. Then, the product of the length of the line E and the length of the line F is calculated, and this value is taken as the area of the dry ion exchange membrane.

Further, the area of the ion exchange membrane after the immersion means the product of the length of the line E and the length of the line F after the immersion in water.

However, with respect to a dry ion exchange membrane in which the terminal of the sulfonic acid type functional group is other than a hydrogen atom (hereinafter referred to also as "H type"), the terminal of the sulfonic acid type functional group was converted to a hydrogen atom by immersing in a 1M sulfuric acid. Then, the temperature of the water to be immersed was set to be room temperature (23° C.) or 100° C., and the rate of change of the membrane area was measured.

[Change Rate of Membrane Thickness of Dry Ion Exchange Membrane Before and After Immersion in Water]

The change rate of membrane thickness of the ion exchange membrane after immersion in water to membrane thickness of the dry ion exchange membrane (membrane thickness of ion exchange membrane after immersion in water/membrane thickness of dry ion exchange membrane) was measured in accordance with the method as described above. Here, the immersion time in water was set to be 1 hour.

However, with respect to a dry ion exchange membrane in which the terminal of the sulfonic acid type functional group is a hydrogen atom (hereinafter referred to also as "H type"), the terminal of the sulfonic acid type functional group was converted to a hydrogen atom by immersing in a 1M sulfuric acid. Subsequently, the temperature of the water to be immersed was set to be room temperature (23° C.) or 100° C., and the rate of change of the film thickness was measured.

[Presence or Absence of Wrinkles]

The appearance of wrinkles after the dry ion exchange membrane was immersed in water was visually confirmed. The temperature of the water to be immersed was set to be 100° C., and the immersion time was set to be 24 hours. The evaluation standards are as follows.

⊚: No wrinkles are observed (area change rate at 100° C. is at most 20%).

○: Wrinkles are slightly confirmed (area change rate at 100° C. is more than 20% and at most 40%).

Δ: Many wrinkles are confirmed (area change rate at 100° C. is more than 40% and at most 90%).

x: Further many wrinkles are confirmed, and the flatness of the membrane is poor (area change rate at 100° C. is more than 90%).

[Orientation Parameter]

<Measuring Device and Measuring Conditions>

Device: Product name LabRAM HR-800 (manufactured by Horiba Ltd.)

Irradiation light: laser light with wavelength of 532 nm

<Method for Measuring Orientation Parameter (B1/A1)>

The ion exchange membrane was cut by a razor along the axial direction parallel to the thickness direction of the ion exchange membrane to expose a cross section of the ion exchange membrane.

Next, to the cross section, polarized light was irradiated in a direction orthogonal to the thickness direction of the ion exchange membrane, and a spectrum chart was obtained by Raman spectroscopic analysis using the following device.

The peak area a1 within a range of Raman shift 1,025 to 1,095 $cm^{-1}$ was calculated from the obtained spectrum chart. Further, the peak area a2 within a range of Raman shift 680 to 760 $cm^{-1}$ was calculated from the obtained spectrum chart. Based on the obtained values, A1 (a2/a1) being the ratio of the peak area a2 to the peak area a1, was calculated.

Further, to the cross section, polarized light was irradiated in a direction parallel to the thickness direction of the ion exchange membrane, and a spectrum chart was obtained by Raman spectroscopic analysis using the following device.

From the obtained spectrum chart, the peak area b1 within a range of Raman shift 1,025 to 1,095 $cm^{-1}$ was calculated. Further, from the obtained spectrum chart, the peak area b2 within a range of Raman shift 680 to 760 $cm^{-1}$ was calculated. Based on the obtained values, B1 (b2/b1) being the ratio of the peak area b2 to the peak area b1, was calculated.

From the values obtained as described above, the ratio of B1 to A1 (B1/A1) was calculated. The results are shown in Table 1.

<Method for Measuring Orientation Parameter (B2/A2)>

The ion exchange membrane was cut by a microtome along the axial direction parallel to the thickness direction of the ion exchange membrane to expose a cross section of the ion exchange membrane.

Next, to the cross section, polarized light was irradiated in a direction orthogonal to the thickness direction of the ion exchange membrane, and a spectrum chart was obtained by Raman spectroscopic analysis using the following device.

From the obtained spectrum chart, the peak area a1 within a range of Raman shift 1,025 to 1,095 $cm^{-1}$ was calculated. Further, from the obtained spectrum chart, the peak area a3 within a range of Raman shift 920 to 1,025 $cm^{-1}$ was calculated. Based on the obtained values, A2(a3/a1) being the ratio of the peak area a3 to the peak area a1, was calculated. The results are shown in Table 1.

Further, to the cross section, polarized light was irradiated in a direction parallel to the thickness direction of the ion exchange membrane, and a spectrum chart was obtained by Raman spectroscopic analysis using the following device.

From the obtained spectrum chart, the peak area b1 within a range of Raman shift 1,025 to 1,095 $cm^{-1}$ was calculated. Further, from the obtained spectrum chart, the peak area b3 within a range of Raman shift 920 to 1,025 $cm^{-1}$ was calculated. Based on the obtained values, B2 (b3/b1) being the ratio of the peak area b3 to the peak area b1, was calculated.

From the values obtained as described above, the ratio of B2 to A2 (B2/A2) was calculated. The results are shown in Table 1.

<Method for Measuring Orientation Parameter (H2/H1)>

The ion exchange membrane was cut by a microtome along the axial direction parallel to the thickness direction of the ion exchange membrane to expose a cross section of the ion exchange membrane.

Next, to the cross section, polarized light was irradiated in a direction orthogonal to the thickness direction of the ion exchange membrane, and a spectrum chart was obtained by Raman spectroscopic analysis using the following device.

From the obtained spectrum chart, the height h1 of the highest peak present within a range of Raman shift 1,025 to 1,095 cm$^{-1}$ was calculated. Further, from the obtained spectrum chart, the height h2 of the highest peak within a range of Raman shift 920 to 1,025 cm$^{-1}$ was calculated. Based on the obtained values, H1 (h2/h1) being the ratio of the peak height h2 to the peak height h1, was calculated.

Further, to the cross section, polarized light was irradiated in a direction parallel to the thickness direction of the ion exchange membrane, and a spectrum chart was obtained by Raman spectroscopic analysis using the following device.

From the obtained spectrum chart, the height h3 of the highest peak within a range of Raman shift 1,025 to 1,095 cm$^{-1}$ was calculated. Further, from the obtained spectrum chart, the height h4 of the highest peak within a range of Raman shift 920 to 1,025 cm$^{-1}$ was calculated. Based on the obtained values, H2 (h4/h3) being the ratio of the peak height h4 to the peak height h3, was calculated.

From the values obtained as described above, the ratio of H2 to H1 (H2/H1) was calculated. The results are shown in Table 1.

[Production of Fluorinated Polymer (S'-1)]

$CF_2=CF_2$ and a monomer (X) represented by the following formula (X) were copolymerized to obtain a fluorinated polymer (S'-1) (ion exchange capacity: 1.25 meq/g).

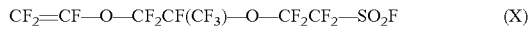

$$CF_2=CF-O-CF_2CF(CF_3)-O-CF_2CF_2-SO_2F \quad (X)$$

[Production of Fluorinated Polymer (S'-2)]

$CF_2=CF_2$ and the monomer (X) represented by the above formula (X) were copolymerized to obtain a fluorinated polymer (S'-2) (ion exchange capacity: 1.00 meq/g).

Here, the ion exchange capacities described in [Production of fluorinated polymer (S'-1)] and [Production of fluorinated polymer (S'-2)] represent the ion exchange capacities of the fluorinated polymers obtainable at the time when the fluorinated polymers (S'-1) and (S'-2) are hydrolyzed by the procedure as described later.

[Production of Film α1]

The fluorinated polymer (S'-1) was molded by a melt extrusion method to obtain a film α1 (film thickness: 90 μm) made of the fluorinated polymer (S'-1).

[Production of Film β2]

The fluorinated polymer (S'-2) was molded by a melt extrusion method to obtain a film β2 (film thickness: 115 μm) made of the fluorinated polymer (S'-2).

[Production of Film γ3]

The fluorinated polymer (S'-1) was molded by a melt extrusion method to obtain a film γ3 (film thickness: 180 μm) made of the fluorinated polymer (S'-1).

[Production of Film δ4]

The fluorinated polymer (S'-1) was molded by a melt extrusion method to obtain a film δ4 (thickness: 45 μm) made of the fluorinated polymer (S'-1).

[Production of Woven Fabric 1]

Woven fabric 1 (reinforcing material) was obtained by using a 50-denier yarn made of PTFE for warp and weft, and plain weaving so that the density of the PTFE yarn became to be 80 yarns/inch. The basis weight of the woven cloth 1 was 38 g/m$^2$. The warp and the weft were composed of slit yarns.

[Production of Woven Fabric 2]

Woven fabric 2 (reinforcing material) was obtained by using a 18.6 denier yarn made of PFA for warp and weft, and plain weaving so that the density of PFA yarn became to be 100 yarns/inch. The basis weight of the woven fabric 2 was 16.3 g/m$^2$. The warp and the weft were composed of slit yarns.

[Production of Woven Fabric 3]

Woven fabric 3 (reinforcing material) was obtained by using a 11.7 denier yarn made of PPS for the warp and the weft and plain weaving so that the density of the PPS yarn became to be 100 yarns/inch. The basis weight of the woven fabric 3 was 10.2 g/m$^2$. The warp and the weft were composed of slit yarns.

Example 1

PET film/film α1/woven fabric 1/film α1/PET film were laminated in this order. The laminated respective members were thermocompression bonded for 10 minutes by a flat plate press machine at a temperature of 200° C. and a surface pressure of 30 MPa/m$^2$, and then the transfer substrates on both sides were peeled at a temperature of 50° C. to obtain a precursor film.

The precursor film was immersed at 95° C. for 30 minutes in a solution of dimethylsulfoxide/potassium hydroxide/water=30/5.5/64.5 (mass ratio) to hydrolyze a group capable of being converted to a sulfonic acid type functional group in the precursor film, to convert it a sulfonic acid type functional group having a potassium atom (hereinafter referred to as "K type") at the terminal, and then washed with water. Then, it was immersed in an aqueous solution of sodium hydroxide to convert the terminal of the sulfonic acid type functional group from the K type to a sulfonic acid type functional group having a sodium atom at the terminal (hereinafter referred to also as "Na type").

The obtained membrane (undried membrane) was immersed in water of 100° C. for 1 hour to obtain a wet ion exchange membrane (contact heat treatment).

The wet ion exchange membrane was dried at a temperature (250° C.) higher than the softening point of the fluorinated polymer, while the periphery of the wet ion exchange membrane was fixed by a metal restraint frame so that there was no slack in the wet ion exchange membrane (drying step), to obtain a dry ion exchange membrane of Example 1. Here, drying of the wet ion exchange membrane was conducted sufficiently until the content of the liquid medium in the obtained dry ion exchange membrane became to be at most 10 mass %.

Example 2

A dry ion exchange membrane of Example 2 was obtained in the same manner as in Example 1 except that in the drying step, the wet ion exchange membrane was dried at a temperature (90° C.) below the softening point.

Example 3

A dry ion exchange membrane of Example 3 was obtained in the same manner as in Example 1 except that the contact heat treatment was not performed.

Example 4

PET film/film α1/woven fabric 1/film α1/PET film were laminated in this order. The respective laminated members were thermocompression bonded for 10 minutes by a flat plate press machine at a temperature of 200° C. and a surface pressure of 30 MPa/m², and then the transfer substrates (PET films) on both sides were peeled at a temperature of 50° C. to obtain a precursor membrane.

The precursor membrane was immersed at 95° C. for 30 minutes in a solution of dimethylsulfoxide/potassium hydroxide/water=30/5.5/64.5 (mass ratio) to hydrolyze a group capable of being converted to a sulfonic acid type functional group in the precursor film, to convert it to a K type sulfonic acid type functional group, and then washed with water. Then, the obtained membrane was immersed in 1M sulfuric acid to convert the terminal of the sulfonic acid type functional group from K type to H type. In this way, a wet ion exchange membrane was obtained.

The wet ion exchange membrane was dried (drying step) at a temperature (105° C.) of at least the softening point of the fluorinated polymer, while keeping the periphery of the obtained wet ion exchange membrane fixed by a metal restraint frame, to obtain a dry ion exchange membrane in Example 4. Here, drying of the wet ion exchange membrane was conducted sufficiently until the content of the liquid medium in the dry ion exchange membrane became to be at most 10 mass %.

Example 5

PET film/film β2/woven fabric 1/film β2/PET film were laminated in this order. The laminated respective members were thermocompression bonded for 10 minutes by a flat plate press machine at a temperature of 200° C. and a surface pressure of 30 MPa/m², and then the transfer substrates on both sides were peeled at a temperature of 50° C. to obtain a precursor film.

A dry ion exchange membrane in Example 5 was obtained in the same manner as in Example 1 except that the precursor membrane thus obtained was used.

Example 6

A dry ion exchange membrane in Example 6 was obtained in the same manner as in Example 1 except that the contact heat treatment was not carried out, and in the drying step, the wet ion exchange membrane was dried at a temperature (90° C.) below the softening point.

Example 7

A dry ion exchange membrane in Example 7 was obtained in the same manner as in Example 3 except that, before the drying step, the content of the liquid medium contained in the wet ion exchange membrane was changed to the value shown in Table 1.

Example 8

A dry ion exchange membrane in Example 8 was obtained in the same manner as in Example 3 except that the wet ion exchange membrane fixed by a metal frame was stretched during drying so that the dimensional changes in the MD direction and the TD direction of the wet ion exchange membrane before and after drying became to be the values shown in Table 1.

Example 9

A dry ion exchange membrane in Example 9 was obtained in the same manner as in Example 3, except that the drying step was performed by fixing the periphery of the wet ion exchange membrane by a metal restraint frame in a state where the wet ion exchange membrane was slackened so that the dimensional changes in the MD direction and the TD direction of the wet ion exchange membrane before and after drying became to be the values in Table 1.

Example 10

A film γ3 as a precursor membrane was immersed at 95° C. for 30 minutes in a solution of dimethylsulfoxide/potassium hydroxide/water=30/5.5/64.5 (mass ratio) to hydrolyze the group capable of being converted to a sulfonic acid type functional group in the precursor membrane to convert it to a K type sulfonic acid type functional group, and then washed with water. Then, the obtained membrane was immersed in 1M sulfuric acid to convert the terminal of the sulfonic acid type functional group from K type to H type. In this way, a wet ion exchange membrane was obtained.

The wet ion exchange membrane was dried at a temperature (105° C.) above the softening point of the fluorinated polymer (drying step), while fixing the periphery of the obtained wet ion exchange membrane with a metal restraint frame, to obtain a dry ion exchange membrane in Example 10. Here, drying of the wet ion exchange membrane was conducted sufficiently until the content of the liquid medium in the dry ion exchange membrane became to be at most 10 mass %.

Example 11

A film γ3 as a precursor membrane was immersed at 95° C. for 30 minutes in a solution of dimethylsulfoxide/potassium hydroxide/water=30/5.5/64.5 (mass ratio) to hydrolyze the group capable of being converted to a sulfonic acid type functional group in the precursor membrane, to convert it to a K type sulfonic acid type functional group, and then washed with water. Then, the obtained membrane was immersed in 1M sulfuric acid to convert the terminal of the sulfonic acid type functional group from K type to H type.

The obtained membrane (undried membrane) was immersed in water of 100° C. for 1 hour to obtain a wet ion exchange membrane (contact heat treatment).

The wet ion exchange membrane was dried at a temperature (105° C.) of at least the softening point of the fluorinated polymer (drying step), while fixing the periphery of the obtained wet ion exchange membrane with a metal restraint frame to obtain a dry ion exchange membrane in Example 10. Here, drying of the wet ion exchange membrane was conducted sufficiently until the content of the liquid medium in the dry ion exchange membrane became to be at most 10 mass %.

Example 12

A dry ion exchange membrane in Example 12 was obtained in the same manner as in Example 11 except that in the drying step, the wet ion exchange membrane was dried at a temperature (room temperature: 23° C.) lower than the softening point.

Example 13

A dry ion exchange membrane was obtained in Example 13 was obtained in the same manner as in Example 11 except that without performing the contact heat treatment, the wet ion-exchange membrane was dried at a temperature (room temperature: 23° C.) below the softening point in the drying step.

Example 14

A film γ3 as a precursor membrane was immersed at 95° C. for 30 minutes in a solution of dimethylsulfoxide/potassium hydroxide/water=30/5.5/64.5 (mass ratio) to hydrolyze the group capable of being converted to a sulfonic acid type functional group in the precursor to convert it to a K type sulfonic acid type functional group, and then washed with water. Then, it was immersed in an aqueous sodium hydroxide solution to convert the terminal of the sulfonic acid type functional group from K type to Na type.

The obtained membrane (undried membrane) was immersed in water of 100° C. for 1 hour to obtain a wet ion exchange membrane (contact heat treatment).

The wet ion exchange membrane was dried at a temperature (250° C.) higher than the softening point of the fluorinated polymer while the periphery of the wet ion exchange membrane was fixed by a metal restraint frame so that there was no slack in the wet ion exchange membrane (drying step), to obtain a dry ion exchange membrane in Example 14. Here, drying of the wet ion exchange membrane was conducted sufficiently until the content of the liquid medium in the obtained dry ion exchange membrane became to be at most 10 mass %.

Example 15

A dry ion exchange membrane in Example 15 was obtained in the same manner as in Example 14 except that the film β2 was used as the precursor membrane.

Example 16

A dry ion exchange membrane in Example 16 was obtained in the same manner as in Example 11 except that the film β2 was used as the precursor membrane.

Example 17

A dry ion exchange membrane in Example 17 was obtained in the same manner as in Example 10, except that the wet ion exchange membrane fixed with a metal frame was stretched during drying so that the dimensional changes in the MD and TD directions of the wet ion exchange membrane before and after drying became to be the values shown in Table 1.

Example 18

PET film/film δ4/woven fabric 2/film δ4/PET film were laminated in this order. The laminated respective members were thermocompression bonded for 10 minutes by a flat plate press machine at a temperature of 200° C. and a surface pressure of 30 MPa/m², and then the transfer substrates on both sides were peeled at a temperature of 50° C. to obtain a precursor membrane.

The precursor membrane was immersed at 95° C. for 30 minutes in a solution of dimethylsulfoxide/potassium hydroxide/water=30/5.5/64.5 (mass ratio) to hydrolyze the group capable of converting to a sulfonic acid type functional group in the precursor membrane, to convert it to a K type sulfonic acid type functional group, and then washed with water. Then, it was immersed in an aqueous sodium hydroxide solution to convert the terminal of the sulfonic acid type functional group from K type to Na type. The obtained membrane (undried membrane) was immersed in water of 100° C. for 1 hour to obtain a wet ion exchange membrane (contact heat treatment).

The wet ion exchange membrane was dried at a temperature (250° C.) higher than the softening point of the fluorinated polymer while the periphery of the wet ion exchange membrane was fixed by a metal restraint frame so that there was no slack in the wet ion exchange membrane (drying step), to obtain a dry ion exchange membrane in Example 18. Here, drying of the wet ion exchange membrane was conducted sufficiently until the content of the liquid medium in the obtained dry ion exchange membrane became to be at most 10 mass %.

Example 19

PET film/film δ4/woven fabric 2/film δ4/PET film were laminated in this order. The laminated respective members were thermocompression bonded for 10 minutes by a flat plate press machine at a temperature of 200° C. and a surface pressure of 30 MPa/m², and then the transfer substrates on both sides were peeled at a temperature of 50° C. to obtain a precursor film.

The precursor film was immersed at 95° C. for 30 minutes in a solution of dimethylsulfoxide/potassium hydroxide/water=30/5.5/64.5 (mass ratio) to hydrolyze the group capable of converting to a sulfonic acid type functional group in the precursor film to convert it to a K type sulfonic acid type functional group, and then washed with water. Then, the obtained membrane was immersed in 1M sulfuric acid to convert the terminal of the sulfonic acid type functional group from K type to H type.

The obtained membrane (undried membrane) was immersed in water of 100° C. for 1 hour to obtain a wet ion exchange membrane (contact heat treatment).

The wet ion exchange membrane was dried at a temperature (105° C.) higher than the softening point of the fluorinated polymer while fixing the periphery of the wet ion exchange membrane by a metal restraint frame so that there was no slack in the wet ion exchange membrane (drying step), to obtain a dry ion exchange membrane in Example 19. Here, drying of the wet ion exchange membrane was conducted sufficiently until the content of the liquid medium in the obtained dry ion exchange membrane became to be at most 10 mass %.

Example 20

A dry ion exchange membrane in Example 20 was obtained in the same manner as in Example 19 except that the contact heat treatment was not performed.

Example 21

A dry ion exchange membrane in Example 21 was obtained in the same manner as in Example 18 except that woven fabric 3 was used instead of woven fabric 1.

Example 22

A dry ion exchange membrane in Example 22 was obtained in the same manner as in Example 19 except that woven fabric 3 was used instead of woven fabric 2.

Comparative Example 1

A dry ion exchange membrane in Comparative Example 1 was obtained in the same manner as in Example 1 except that in the drying step, the periphery of the obtained wet ion exchange membrane was not fixed by a metal restraint frame.

Comparative Example 2

A dry ion exchange membrane in Comparative Example 2 was obtained in the same manner as in Example 1 except that the contact heat treatment was not performed, the periphery of the wet ion exchange membrane was not fixed by a metal restraint frame in the drying step, and the wet ion exchange membrane was dried at a temperature (90° C.) below the softening point.

Comparative Example 3

A dry ion exchange membrane in Comparative Example 3 was obtained in the same manner as in Example 4 except that in the drying step, the periphery of the wet ion exchange membrane was not fixed by a metal restraint frame, and the wet ion exchange membrane was dried at a temperature (room temperature: 23 to 25° C.) below the softening point of the wet ion exchange membrane.

Comparative Example 4

A dry ion exchange membrane in Comparative Example 4 was obtained in the same manner as in Example 10, except that in the drying step, the periphery of the wet ion-exchange membrane was not fixed by a metal restraint frame, and the wet ion-exchange membrane was dried at a temperature (room temperature 23 to 25° C.) below the softening point.

Comparative Example 5

A dry ion exchange membrane in Comparative Example 5 was obtained in the same manner as in Example 14 except that the contact heat treatment was not performed, and in the drying step, the periphery of the wet ion exchange membrane was not fixed by a metal restraint frame and the wet ion exchange membrane was dried at a temperature (90° C.) below the softening point.

Comparative Example 6

A dry ion exchange membrane in Comparative Example 6 was obtained in the same manner as in Example 14 except that, in the drying step, the periphery of the wet ion exchange membrane was not fixed by a metal restraint frame, and the wet ion exchange membrane was dried at a temperature (90° C.) below the softening point.

Comparative Example 7

A dry ion exchange membrane in Comparative Example 7 was obtained in the same manner as in Example 14 except that in the drying step, the periphery of the wet ion exchange membrane was not fixed by a metal restraint frame.

The above-mentioned various physical properties and evaluation tests described above were conducted by using the obtained respective dry ion exchange membranes. The results are shown in Table 1.

In the Table, AR means ion exchange capacity (meq/g).

TABLE 1

| Examples | Production conditions for dry ion exchange membrane | | | Dimensional change of wet membrane before and after drying | | Content (%) of liquid medium in wet ion exchange membrane | Drying exchange membrane | | | |
|---|---|---|---|---|---|---|---|---|---|---|
| | Drying step | | | | | | Fluorinated polymer | | | |
| | Contact heat treatment Present/ absent | Drying at a temperature of at least softening point | Restrain | MD direction (%) | TD direction (%) | | Content (%) of liquid medium | Terminal of sulfonic acid functional group | AR (meq/g) | Reinforcing material |
| Ex. 1 | Present | Present | Present | 0 | 0 | 56 | At most 10% | Na | 1.25 | PTFE |
| 2 | Present | Absent | Present | 0 | 0 | 56 | At most 10% | Na | 1.25 | PTFE |
| 3 | Absent | Present | Present | 0 | 0 | 35 | At most 10% | Na | 1.25 | PTFE |
| 4 | Absent | Present | Present | 0 | 0 | 44 | At most 10% | H | 1.25 | PTFE |
| 5 | Present | Present | Present | 0 | 0 | 23 | At most 10% | Na | 1.00 | PTFE |
| 6 | Absent | Absent | Present | 0 | 0 | 35 | At most 10% | Na | 1.25 | PTFE |
| 7 | Absent | Present | Present | 0 | 0 | 20 | At most 10% | Na | 1.25 | PTFE |
| 8 | Absent | Present | Present | 0 | 20 | 35 | At most 10% | Na | 1.25 | PTFE |
| 9 | Absent | Present | Present | −5 | −5 | 35 | At most 10% | Na | 1.25 | PTFE |
| 10 | Absent | Present | Present | 0 | 0 | 57 | At most 10% | H | 1.25 | Absent |
| 11 | Present | Present | Present | 0 | 0 | 99 | At most 10% | H | 1.25 | Absent |
| 12 | Present | Absent | Present | 0 | 0 | 99 | At most 10% | H | 1.25 | Absent |
| 13 | Absent | Absent | Present | 0 | 0 | 57 | At most 10% | H | 1.25 | Absent |
| 14 | Present | Present | Present | 0 | 0 | 56 | At most 10% | Na | 1.25 | Absent |
| 15 | Present | Present | Present | 0 | 0 | 25 | At most 10% | Na | 1.00 | Absent |
| 16 | Present | Present | Present | 0 | 0 | 40 | At most 10% | H | 1.00 | Absent |
| 17 | Absent | Present | Present | 10 | 10 | 57 | At most 10% | H | 1.25 | Absent |
| 18 | Present | Present | Present | 0 | 0 | 56 | At most 10% | Na | 1.25 | PFA |
| 19 | Present | Present | Present | 0 | 0 | 78 | At most 10% | H | 1.25 | PFA |
| 20 | Absent | Present | Present | 0 | 0 | 55 | At most 10% | H | 1.25 | PFA |
| 21 | Present | Present | Present | 0 | 0 | 42 | At most 10% | Na | 1.25 | PPS |
| 22 | Present | Present | Present | 0 | 0 | 56 | At most 10% | H | 1.25 | PPS |

TABLE 1-continued

| | | | | | | | | | | | |
|---|---|---|---|---|---|---|---|---|---|---|---|
| Comp. Ex. | 1 | Present | Present | Absent | −13 | −18 | 35 | At most 10% | Na | 1.25 | PTFE |
| | 2 | Absent | Absent | Absent | −16 | −16 | 35 | At most 10% | Na | 1.25 | PTFE |
| | 3 | Absent | Absent | Absent | −15 | −16 | 44 | At most 10% | H | 1.25 | PTFE |
| | 4 | Absent | Absent | Absent | −22 | −23 | 57 | At most 10% | H | 1.25 | Absent |
| | 5 | Absent | Absent | Absent | −20 | −19 | 33 | At most 10% | Na | 1.25 | Absent |
| | 6 | Present | Absent | Absent | −30 | −28 | 56 | At most 10% | Na | 1.25 | Absent |
| | 7 | Present | Present | Absent | −24 | −24 | 56 | At most 10% | Na | 1.25 | Absent |

| Examples | | Reinforcing material change rate (times) in membrane thickness of dry ion exchange membrane before and after immersion in water Room temperature (23° C.)/100° C. | Orientation parameter (B1/A1) | Orientation parameter (B2/A2) | Orientation parameter (H2/H1) | Change rate (%) in membrane area of dry ion exchange membrane before and after immersion in water Room temperature (23° C.) | 100° C. | Presence or absence of formation of wrinkles |
|---|---|---|---|---|---|---|---|---|
| Ex. | 1 | 1.7/2.3 | — | — | — | 3 | 3 | ◎ |
| | 2 | 1.8/2.0 | — | — | — | 5 | 7 | ◎ |
| | 3 | 1.8/2.2 | 1.05 | 1.13 | 1.11 | 4 | 5 | ◎ |
| | 4 | 1.6/2.0 | — | — | — | 0 | 2 | ◎ |
| | 5 | 1.3/1.6 | — | — | — | 5 | 5 | ◎ |
| | 6 | 1.6/1.9 | — | — | — | 8 | 9 | ◎ |
| | 7 | 1.7/2.2 | — | — | — | 14 | 15 | ◎ |
| | 8 | 1.7/2.3 | 1.18 | 1.47 | 1.40 | 4 | 4 | ◎ |
| | 9 | 1.7/2.1 | — | — | — | 8 | 9 | ◎ |
| | 10 | 2.2/2.7 | 1.12 | 1.24 | 1.35 | 8 | 30 | ○ |
| | 11 | — | 1.32 | 1.48 | 1.54 | 8 | 15 | ◎ |
| | 12 | — | 1.14 | 1.16 | 1.20 | 7 | 17 | ◎ |
| | 13 | — | 1.12 | 1.15 | 1.14 | 11 | 31 | ○ |
| | 14 | — | 1.20 | 1.42 | 1.57 | 18 | 38 | ○ |
| | 15 | — | 1.07 | 1.11 | 1.14 | 14 | 26 | ○ |
| | 16 | — | 1.10 | 1.07 | 1.06 | 7 | 8 | ◎ |
| | 17 | — | 1.16 | 1.15 | 1.12 | 6 | 8 | ◎ |
| | 18 | — | 1.16 | 1.31 | 1.38 | 8 | 12 | ◎ |
| | 19 | — | 1.06 | 1.07 | 1.06 | 5 | 3 | ◎ |
| | 20 | — | 1.06 | 1.06 | 1.06 | 7 | 9 | ◎ |
| | 21 | — | 1.12 | 1.18 | 1.23 | 5 | 5 | ◎ |
| | 22 | — | 1.05 | 1.10 | 1.08 | 2 | 1 | ◎ |
| Comp. Ex. | 1 | 1.3/1.8 | — | — | — | 40 | 41 | Δ |
| | 2 | 1.2/1.5 | — | — | — | 42 | 45 | Δ |
| | 3 | 1.4/1.7 | — | — | — | 39 | 41 | Δ |
| | 4 | 1.3/1.6 | 1.01 | 0.96 | 1.01 | 51 | 91 | X |
| | 5 | — | 0.96 | 0.97 | 0.95 | 75 | 135 | X |
| | 6 | — | 1.00 | 0.97 | 0.98 | 97 | 152 | X |
| | 7 | — | 0.98 | 0.94 | 0.96 | 63 | 128 | X |

As shown in Table 1, when the wet ion exchange membrane was dried under the condition that the dimensional changes in the MD direction and the TD direction of the wet ion exchange membrane before and after the drying became respectively at least −5%, it was confirmed that in a case where the dry ion exchange membrane was immersed in water, the dimensional stability in the in-plane direction was excellent (Examples 1 to 22).

On the other hand, when the wet ion exchange membrane was dried under the condition that the dimensional changes in the MD direction and the TD direction of the wet ion exchange membrane before and after drying became less than −5%, it was confirmed that in a case where the dry ion exchange membrane was immersed in water, the dimensional stability in the in-plane direction was poor (Comparative Examples 1 to 7).

As shown in Table 1, when the orientation parameter (B1/A1) was at least 1.05, it was confirmed that in a case where the ion exchange membrane was immersed in water, the dimensional stability in the in-plane direction was excellent (Examples 3, 8, 11 to 22).

On the other hand, when the orientation parameter (B1/A1) was less than 1.05, it was confirmed that in a case where the ion exchange membrane was immersed in water, the dimensional stability in the in-plane direction was poor (Comparative Examples 4 to 7).

REFERENCE SYMBOLS

10: Dry ion exchange membrane, 12: Cross section, 12A, 12B: Direction, T: Thickness direction, a1, a2, a3: Peak area, PA, PB: Polarized light, M1: Main chain of fluorinated polymer This application is a continuation of PCT Application No. PCT/JP2019/023744, filed on Jun. 14, 2019, which is based upon and claims the benefit of priority from Japanese Patent Application No. 2018-114511 filed on Jun. 15, 2018 and Japanese Patent Application No. 2019-016153 filed on Jan. 31, 2019. The contents of those applications are incorporated herein by reference in their entireties.

What is claimed is:

1. An ion exchange membrane containing a fluorinated polymer having a group represented by —$SO_3M$ (M is a hydrogen atom, an alkali metal or a quaternary ammonium cation) and, in the main chain, a group represented by —$CF_2$—, wherein in a case where by Raman spectroscopy, to a cross section in the thickness direction of the ion exchange membrane, polarized light orthogonal to the thickness direction is irradiated to obtain a spectrum chart, whereby the ratio of the peak area a2 of Raman shift 680 to 760 cm$^{-1}$ to the peak area a1 of Raman shift 1,025 to 1,095 cm$^{-1}$ is taken as A1, and by Raman spectroscopy, to a cross section in the thickness direction of the ion exchange membrane, polarized light parallel to the thickness direction is irradiated to obtain a spectrum chart, whereby the ratio of the peak area b2 of Raman shift 680 to 760 cm$^{-1}$ to the peak area b1 of Raman shift 1,025 to 1,095 cm$^{-1}$ is taken as B1, the ratio of said B1 to said A1 is at least 1.05, wherein the ion exchange capacity of the fluorinated polymer is 1.25 to 2.05 meq/g dry resin, and wherein the fluorinated polymer further has an ether bond site in a side chain, and in a case where by Raman spectroscopy, to a cross section in the thickness direction of the ion exchange membrane, polarized light orthogonal to the thickness direction is irradiated to obtain a spectrum chart, whereby the ratio of the height h2 of the highest peak within a range of Raman shift 920 to 1,025 cm$^{-1}$ to the height h1 of the highest peak within a range of Raman shift 1,025 to 1.095 cm$^{-1}$ is taken as H1, and by Raman spectroscopy, to a cross section in the thickness direction of the ion exchange membrane, polarized light parallel to the thickness direction is irradiated to obtain a spectrum chart, whereby the ratio of the height h4 of the highest peak within a range of Raman shift 920 to 1,025 cm$^{-1}$ to the height h3 of the highest peak within a range of Raman shift 1,025 to 1,095 cm$^{-1}$ is taken as H2, the ratio of said H2 to said H1 is at least 1.15.

2. The ion exchange membrane according to claim 1, wherein the fluorinated polymer has a unit represented by the formula (1):

    Formula (1)

in the formula (1), L is an n+1-valent perfluorohydrocarbon group which may contain an oxygen atom, M is a hydrogen atom, an alkali metal or a quaternary ammonium cation, and n is 1 or 2.

3. The ion exchange membrane according to claim 2, wherein the ether bond site of the side chain is a site contained in a unit obtained by polymerizing at least one type of monomer selected from the group consisting of the following monomers (A) to (E):

$$CF_2\!=\!CF\!-\!O\!-\!CF_2CF(CF_3)\!-\!O\!-\!CF_2CF_2\!-\!SO_2F \quad (A)$$

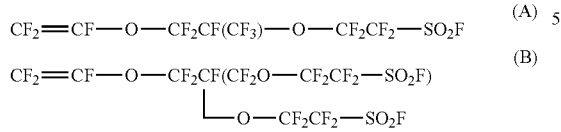

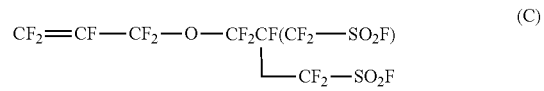

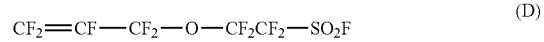

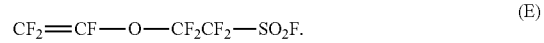

4. The ion exchange membrane according to claim 1, wherein the ion exchange membrane contains a liquid medium, and the content of the liquid medium in the ion exchange membrane is at most 15 mass % to the total mass of the ion exchange membrane.

5. The ion exchange membrane according to claim 4, wherein the liquid medium is at least one of water and a water-soluble organic solvent.

6. A method for producing a dry ion exchange membrane, comprising drying a wet ion exchange membrane having an ion exchange membrane containing a fluorinated polymer having a sulfonic acid type functional group wet with a liquid medium, to remove the liquid medium to obtain a dry ion exchange membrane, characterized in that the dimensional change of the dry ion exchange membrane from the wet ion exchange membrane during drying is at least −5% in each of the MD direction and the TD direction, wherein the drying temperature is at least the softening point of the fluorinated polymer.

7. The method for producing a dry ion exchange membrane according to claim 6, wherein the content of the liquid medium in the dry ion exchange membrane is at most 15 mass % to the total mass of the dry ion exchange membrane.

8. The method for producing a dry ion exchange membrane according to claim 6, wherein the dimensional change of the dry ion exchange membrane from the wet ion exchange membrane during drying is at most 50% in each of the MD direction and the TD direction.

9. The method for producing a dry ion exchange membrane according to claim 6, wherein the content of the liquid medium in the wet ion exchange membrane is at least 20 mass % to the total mass of the wet ion exchange membrane.

10. The method for producing a dry ion exchange membrane according to claim 6, wherein the wet ion exchange membrane is obtained by contacting the ion exchange membrane containing the fluorinated polymer with the liquid medium at a temperature of at least 60° C.

11. The method for producing a dry ion exchange membrane according to claim 6, wherein a reinforcing material is contained inside or at the surface of the wet ion exchange membrane.

* * * * *